US010640412B2

(12) United States Patent
Sønderkaer

(10) Patent No.: US 10,640,412 B2
(45) Date of Patent: May 5, 2020

(54) THERMAL TREATMENT OF PANE ELEMENTS FOR VACUUM INSULATING GLASS UNITS

(71) Applicant: VKR HOLDING A/S, Hørsholm (DK)

(72) Inventor: Peter Sønderkaer, Horsens (DK)

(73) Assignee: VKR HOLDING A/S, Hørsholm (DK)

(*) Notice: Subject to any disclaimer, the term of this patent is extended or adjusted under 35 U.S.C. 154(b) by 288 days.

(21) Appl. No.: 15/898,380

(22) Filed: Feb. 16, 2018

(65) Prior Publication Data

US 2019/0062195 A1 Feb. 28, 2019

(30) Foreign Application Priority Data

Feb. 17, 2017 (DK) .................................. 2017 70110

(51) Int. Cl.
  *C03B 23/24* (2006.01)
  *E06B 3/66* (2006.01)
  *E06B 3/673* (2006.01)
  *E06B 3/663* (2006.01)

(52) U.S. Cl.
  CPC .......... *C03B 23/245* (2013.01); *E06B 3/6612* (2013.01); *E06B 3/66357* (2013.01); *E06B 3/6733* (2013.01); *E06B 3/67334* (2013.01); *E06B 3/67365* (2013.01); *C03B 2225/00* (2013.01); *Y02A 30/25* (2018.01); *Y02B 80/24* (2013.01)

(58) Field of Classification Search
  CPC ...... C03B 23/245; C03B 17/04; E06B 3/6612
  See application file for complete search history.

(56) References Cited

U.S. PATENT DOCUMENTS

| 6,641,689 B1 | 11/2003 | Aggas |
| 9,428,416 B2 | 8/2016 | Cooper et al. |
| 2009/0297861 A1* | 12/2009 | Banks ...................... C03C 8/08 428/428 |
| 2009/0297862 A1* | 12/2009 | Boek ........................ C03C 3/21 428/428 |

(Continued)

FOREIGN PATENT DOCUMENTS

| EP | 0090790 | 10/1983 |
| EP | 1571134 A1 | 9/2005 |

(Continued)

*Primary Examiner* — Cynthia Szewczyk
(74) *Attorney, Agent, or Firm* — Cantor Colburn LLP

(57) ABSTRACT

A method for manufacturing a plurality of vacuum insulating glass (VIG) units, wherein the method comprises providing a plurality of first glass panes, applying a soldering material arranged for subsequent connection with a second glass pane to provide a seal between an outside of the VIG unit and an inside void of the VIG unit, moving the first glass panes comprising the soldering material into a treatment compartment, wherein the treatment compartment is preheated, drying the soldering material in a heating step by evaporating solvent, wherein the heating is forced convection heating, moving the first glass panes to a cooling compartment, cooling first glass panes and the soldering material thereon in a cooling step, wherein the cooling is by forced convection cooling, moving the first glass panes from the cooling compartment, and subsequently connecting the first glass panes to second glass panes using the dried soldering material.

22 Claims, 7 Drawing Sheets

(56) References Cited

U.S. PATENT DOCUMENTS

| | | |
|---|---|---|
| 2012/0210750 A1 | 8/2012 | Cooper et al. |
| 2012/0211146 A1 | 8/2012 | Dennis |
| 2013/0059087 A1 | 3/2013 | Veerasamy et al. |
| 2013/0059160 A1 | 3/2013 | Veerasamy et al. |
| 2014/0261974 A1 | 9/2014 | Wipfler et al. |
| 2015/0218042 A1 | 8/2015 | Hogan et al. |

FOREIGN PATENT DOCUMENTS

| | | |
|---|---|---|
| KR | 20140032637 A | 3/2014 |
| WO | 200123700 A1 | 4/2001 |

* cited by examiner

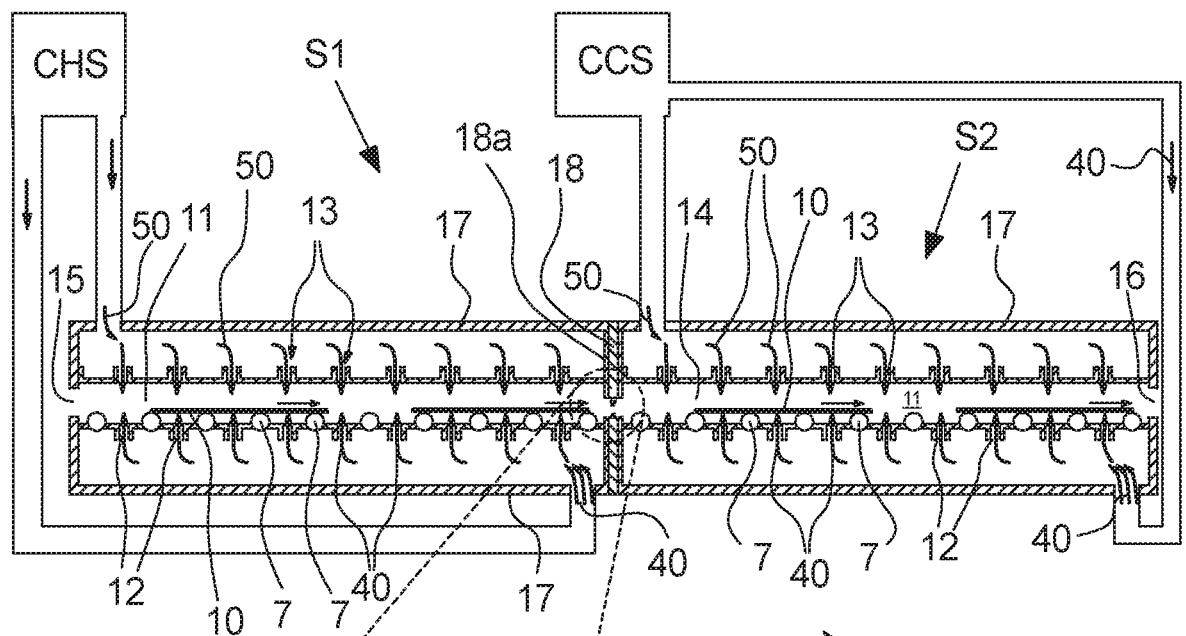
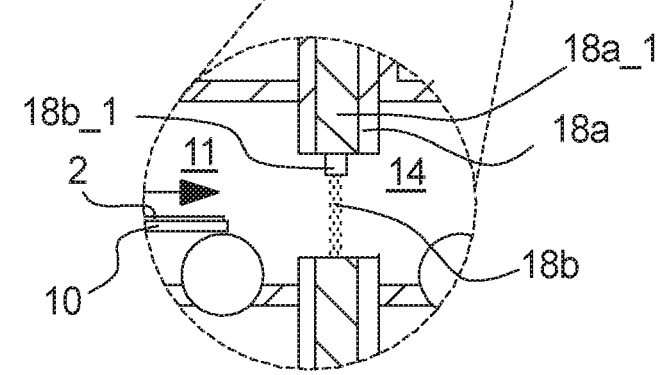
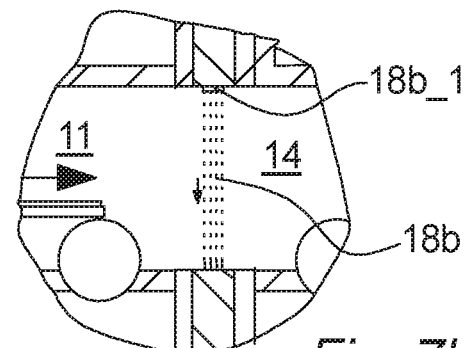
Fig. 7
Fig. 7a
Fig. 7b

THERMAL TREATMENT OF PANE ELEMENTS FOR VACUUM INSULATING GLASS UNITS

This application claims priority to and the benefit of Danish Patent Application No. PA201770110, filed Feb. 17, 2017, in the Danish Patent and Trademark Office, and all the benefits accruing therefrom under 35 U.S.C. § 119, the content of which is incorporated herein in its entirety by reference.

BACKGROUND

The present disclosure relates to methods for manufacturing vacuum insulating glazing units.

Vacuum insulating glass/glazing (VIG) units typically comprise two glass panes spaced by pillars, where the glass panes are sealed at the periphery and where a void between the two panes have been evacuated to provide a vacuum between the panes. The void may be evacuated through a hole in one of the panes to a pressure such as about 1E-6 bar. The seal at the periphery of the panes accordingly needs to be tight in order to provide that the desired internal pressure in the void can be maintained for several years.

The seal at the periphery of the panes may be provided by different seal materials, among these is a sealing material for soldering the panes together. This soldering material may comprise e.g. a soldering powder such as glass frit, a binder material and a solvent.

An example of manufacturing a VIG is disclosed in U.S. Pat. No. 9,428,416 B2. Here it is disclosed that a frit slurry paste is applied to a surface of a substrate, and afterwards the frit slurry paste is dried at a temperature above 100° C. to help to remove a water based solvent from the slurry paste. Then the frit material is heated further to burn out binder material and sinter the frit.

The presently known solutions such as the solution disclosed in U.S. Pat. No. 9,428,416 B2 provides several drawbacks in relation to try to obtain a VIG that can last for many years when e.g. installed in apertures of a building. Moreover, the presently known solutions such as the solution disclosed in U.S. Pat. No. 9,428,416 B2 may provide drawbacks in relation to obtain a more advantageous manufacturing of VIG units.

It may be a goal of the present disclosure to provide a solution to one or more of the above mentioned drawbacks.

BRIEF SUMMARY

The present disclosure relates, in a first aspect, to a method according to claim 1 for manufacturing a plurality of vacuum insulating glazings/VIG units, wherein said method may comprise the steps of: providing a plurality of first pane elements, applying a soldering material in paste form on a first surface along side edges of the first pane elements, where the soldering material is arranged for subsequent connection with a second pane element in order to provide a sealing between the outside of the vacuum pane and an inside void/gap of the vacuum pane where vacuum is to be provided, moving the first pane elements comprising the soldering material into a first pre-heated thermal treatment compartment of a furnace arrangement, drying out the soldering material on the first pane elements in a heating step by evaporating solvent from the soldering material in the first furnace compartment by means of forced convection heating, moving the first pane elements from the first pre-heated thermal treatment compartment into a cooling compartment of the furnace arrangement, cooling said first pane element and the soldering material thereon in a cooling step in the cooling compartment by means of forced convection cooling, moving the first pane elements from the cooling compartment, and subsequently connecting the first pane elements to second pane elements by means of the dried out soldering material.

BRIEF DESCRIPTION OF THE DRAWINGS

Aspects of the present disclosure will be described in the following with reference to the following figures in which:

FIG. 7 illustrates schematically a gas convection treatment process according to still further aspects of the present disclosure, comprising separate thermal treatment compartments, FIGS. 7a-7b illustrate schematically a gas convection treatment process according to still further aspects of the present disclosure.

DETAILED DESCRIPTION

Figure 1:
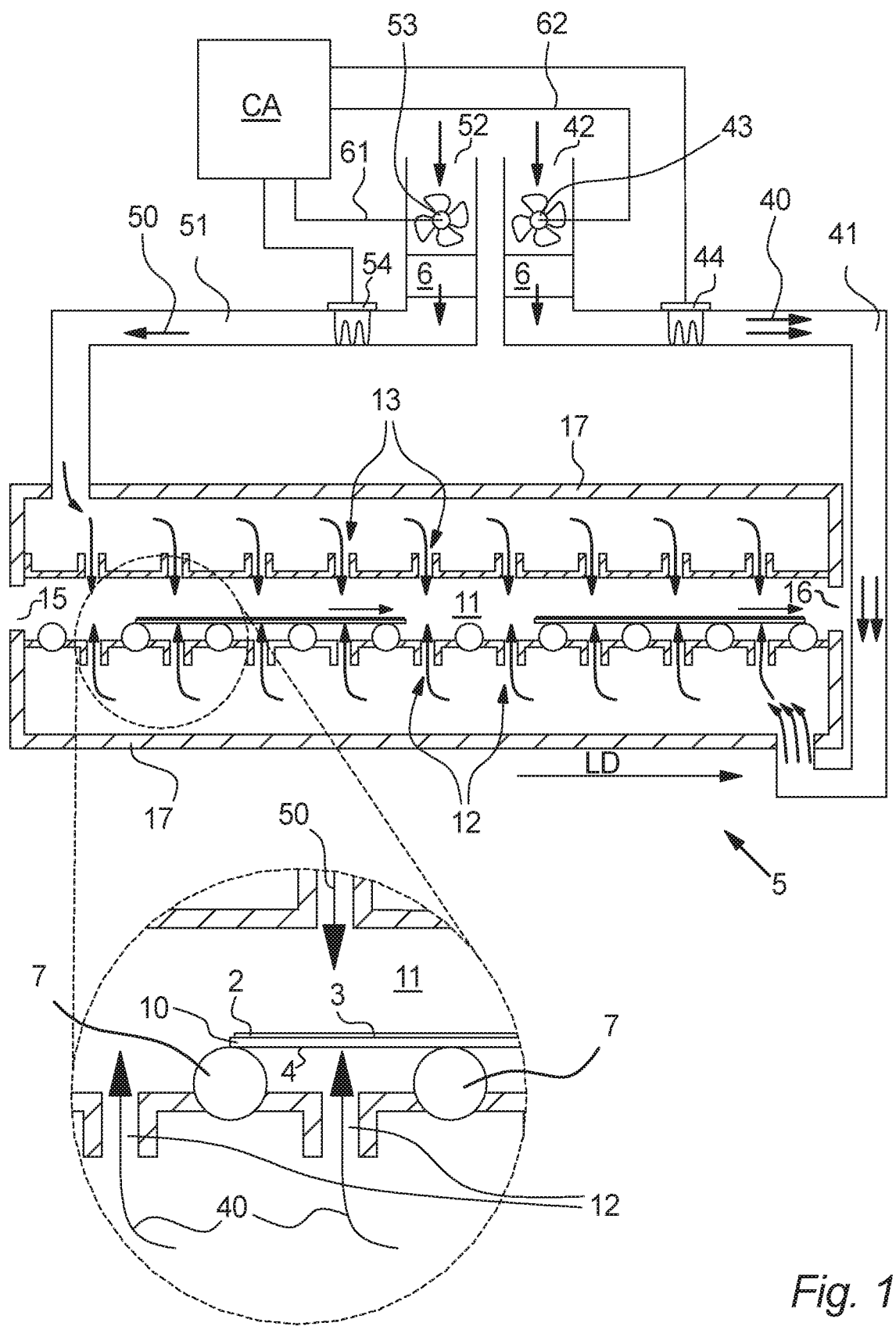
FIG. 1 illustrates schematically a gas convection treatment process according to aspects of the present disclosure.

The pre-heated thermal treatment compartment provides a drying process by convection heating which may significantly increase the evaporation of the solvent, thereby drying out the soldering material on the first pane elements faster. This may however provide that the panes and the soldering material, when leaving the first pre-heated furnace compartment, are too hot to be handled by pane handling equipment such as automation equipment and/or human operators. The cooling step thus cools the panes and the soldering material thereon to a temperature range where the handling equipment may be able to operate, and also provides that the safety in the manufacturing environment is increased due to the reduced pane and soldering material temperature after the cooling step. An evaporation of the solvent may also be present during the cooling step.

Providing a thermal treatment where a cooling process is provided by forced convection cooling to cool the first pane and the soldering material thereon may thus help to increase the manufacturing process speed. This is e.g. caused by that a subsequent handling of the first pane to e.g. connect the first pane to the second pane by means of a holding arrangement such as a suction cup setup or the like arranged to grab the pane at the second surface may be possible faster as the temperature may faster be reduced to a temperature level where the holding arrangement is able to operate.

The method according to the present disclosure may additionally help to provide a fast evaporation of solvent, and thereby help to speed up the manufacturing process during manufacturing of vacuum insulating glazings/glass units.

Generally, the cooling step by convection cooling, after the heating step may also reduce the risk of contaminating the pane surfaces, as the first panes may hereby faster be connected to the second panes in that the panes have been brought to a desired temperature fast so that they can be connected to the second pane surfaces.

Generally, during processing of Vacuum Insulated Glazings/VIG units where a vacuum is provided between two pane elements in order to reduce heat transfer of the pane unit, a soldering material is provided, preferably as one or more strips, between the panes in order to provide a tight sealing between the pane elements. This soldering material is applied in a liquid or wet state/paste state on the upper surface of at least one of the panes, and needs subsequent heat treatment of the material. Also, the solvents of the soldering material, which provides that the soldering material is in the desired paste state, needs to be removed.

As the VIG units is intended to be air tight for many years, preferably 15-25 years such as about 20 years, the sealing along the edges/periphery of the first pane elements as well as the evacuation opening needs to be completely air tight to assure that the vacuum between the pane elements is not reduced over time. However, it also important that the surfaces of the panes facing the void of the VIG unit are clean, as contaminants in the void may reduce the lifetime of the VIG unit substantially as contaminants in the void may result in that the vacuum in the void may faster be reduced, for example by out gassing and exposure to UV light.

It understood that the term "void" may also be referred to as "gap" in the present disclosure.

In advantageous aspects of the present disclosure, the forced convection heating and/or forced convection cooling is provided to the second surface opposite to the first surface of each of the first pane elements by means of a plurality of nozzles of the thermal treatment compartment directed towards said second surfaces.

It is generally understood that this, according to the present disclosure, may be provided during convection heating in a heating step and/or during convection cooling in a cooling step respectively.

The plurality of nozzles of the thermal treatment compartment directed towards said second surfaces are preferably distributed in the longitudinal direction LD of the thermal treatment chamber from the inlet of the chamber/compartment to an outlet of the chamber/compartment. Such nozzles may provide a more controlled gas flow and thermal treatment of the surface.

In preferred aspects of the present disclosure, the forced convection heating is provided at a drying temperature between 140° C. and 240° C., such as between 160° C. and 220° C., preferably between 180° C. and 200° C., such as about 190° C. to evaporate solvent from the soldering material, preferably while maintaining the binder material in the soldering material.

A thermal treatment to dry out the soldering material at the above mentioned temperature ranges may result in a fast evaporation of the solvent from the soldering material, thereby enabling increase of the manufacturing process speed of VIG units, and may also be advantageous in order to e.g. avoid an disadvantageous "shell drying" of the soldering material.

In aspects of the present disclosure, the overall treatment time for the heating step and the cooling step is between 4-15 minutes such as between 5-10 minutes, preferably about 6-9 minutes.

In preferred aspects of the present disclosure, the heating step is provided in a first thermal treatment compartment, and the cooling step is provided in a second thermal treatment compartment arranged after the first thermal treatment compartment. The first and second thermal treatment compartments may preferably, in further aspects of the present disclosure, be separated by a heat insulating arrangement such as a mechanical partition wall arrangement and/or an air curtain/door.

In preferred aspects of the first aspect, the soldering material and/or the first pane element has a temperature between 40° C. and 90° C., preferably between 55° C. and 80° C., such as about 75° C. after cooling by means of the cooling step.

In advantageous aspects of the present disclosure, the heating step and/or cooling step is provided by means of a plurality of first nozzles directed towards said second surfaces, and one or more further nozzles directed towards said first surface comprising the soldering material.

This may e.g. provide a controlled thermal treatment environment when providing a heating step and/or a cooling step. Moreover, it may provide advantageous handling of possible contaminants in the thermal treatment compartment(s), as the first as well as the further nozzles may blow such contaminants away from the respective pane surfaces. Thus, e.g. dust or other particles which may be whirled from the side of the second surface of the respective first pane element by the first nozzles, towards the side of the first surfaces comprising the soldering material, but the further nozzles hence assure that such contaminants are either blown away from the first surface or is kept away from the first surface.

In aspects of the present disclosure, said heating step and/or said cooling step may be provided by means of a forced convection of a temperature controlled gas, by supplying a larger gas flow at the second surface of the pane elements compared to a second gas flow provided simultaneously at the first surface of the first pane elements in said thermal treatment compartment.

The gas flow supplied towards the second surface of the pane elements may in aspects of the first aspect be at least 1.3 times, such as at least 1.5 times, preferably at least two times, such as at least three times, e.g. at least five times larger than a second gas flow provided, preferably simultaneously by a plurality of further nozzles, at the first surface comprising the soldering material during the heating step and/or cooling step.

Advantageously, the thermal treatment compartment and the cooling compartment may in aspects of the present disclosure comprise a conveyer system which is configured for conveying the first pane elements through the thermal treatment compartment, preferably from an inlet opening to an outlet opening. Advantageously, in further aspects, the second surface of the first pane elements may be arranged to support on one or more conveyer elements of the conveyer system, and said heating step and/or cooling step may be provided by means of forced convection of a temperature controlled gas supplied to the second surface of each of the first pane elements between or through the one or more conveying elements, preferably by means of a plurality of nozzles.

The one or more conveyer elements may be part of a roller conveyer system and e.g. comprise a plurality of rollers for supporting and transporting the first panes, an endless chain drive or conveyer belt and/or the like. In further aspects, it is to be understood that the conveyer/conveying system may be of a type where the pane elements hangs from one or more conveyer elements, e.g. substantially vertically. Generally, it is to be understood that the conveyer/conveying system may be of any suitable type for transporting the first pane elements through a convection heating and/or cooling step.

In advantageous aspects of the present disclosure, the gas supplied during the heating step and/or the cooling step is cleansed air such as filtered air which is filtered by a filtering unit before it is supplied towards the first pane elements.

In preferred aspects of the present disclosure, the first and second pane elements are made from tempered glass. Pane elements made from tempered glass has an improved strength compared to non-tempered glass panes, and thus, the distance between the pillars in the void of the VIG may be increased.

In advantageous aspects of the present disclosure, the method is provided in a substantially continuous manufacturing process comprising a first manufacturing line for preparing the first pane elements, and a second manufacturing process for preparing the second pane elements, wherein the first manufacturing line provides the gas convection treatment process, and wherein the second manufacturing line provides a preparation of the second pane elements for connecting to the first pane elements after the heating step and the cooling step wherein the first and second manufacturing lines are substantially parallel processes.

This may result in a faster manufacturing speed of first pane elements with dried out soldering material which may thus increase the overall manufacturing speed of VIG units with an evacuated void/gap, and/or may help to provide a less space consuming manufacturing setup.

The second manufacturing line may in preferred aspects comprise a pillar placing process where a pillar placement arrangement distributes and places a plurality of pillars on an upper surface of the second pane elements.

Preferably, in aspects of the present disclosure, the soldering material on the first pane element may comprise: at least 50% by weight of glass frit, based on the total weight of the soldering material; a binder material, and solvent, when in said paste form to be applied at the first surface of the first pane element.

Preferably, the soldering material on the first pane element may in aspects of the present disclosure comprise: between 60 wt % and 85 wt % glass frit; between 1 wt % and 6 wt % Binder material and other additives; and between 14 wt % and 34 wt % solvent, when in said paste form to be applied at the first surface of the first pane element.

Preferably, in aspects of the present disclosure, the amount of solvent in the soldering material after the gas convection treatment process is less than 3%, preferably less than 1%, such as less than 0.5%, e.g. less than 0.1%.

Advantageously, in aspects of the present disclosure, the volume of the soldering material has decreased by between 30% and 60% such as between 37% and 50%, e.g. around 40%-45% after the heating step and the cooling step. In other aspects of the present disclosure, the volume of the soldering material on the first pane may be decreased by between 3% and 40% such as between 6% and 20%, e.g. around 7%-10% after the cooling step compared to the volume of the soldering material before the heating step.

In preferred aspects of the present disclosure, the soldering material and/or the first pane element has a temperature between 70° C. and 100° C., after cooling by means of the cooling step. This may e.g. help to provide that the panes and the soldering material, when leaving the cooling step, are not too hot to be handled by pane handling equipment such as automation equipment and/or operators. The cooling step may moreover provide that the temperature of the soldering material such as a glass frit material, preferably a lead-free, e.g. vanadium based, glass frit material has the desired temperature and is both substantially shape stable and in a resilient/flexible state when leaving the cooling step. This may provide that an enhanced coupling with the second pane elements may be obtained.

Advantageously, in aspects of the present disclosure, the first pane elements may be subjected to the cooling step for about 1-10 minutes, preferably about 2-6 minutes.

In preferred aspects of the present disclosure, the first pane elements are subjected to the heating step for about 3-15 min, preferably 4-7 minutes.

In preferred aspects of the present disclosure, the cooling gas supplied during the cooling step may have a temperature between 5° C. and 70° C., such as between 10° C. and 45° C., preferably around 15° C.-25° C.

It is generally to be understood that the vacuum insulating glazings may also be referred to as VIG units or vacuum insulating glass units In advantageous aspects of the present disclosure, said moving of the first pane elements from the first pre-heated thermal treatment compartment into a cooling compartment of the furnace arrangement, may be provided by a conveyer system.

In preferred aspects of the present disclosure, said moving of the first pane elements from the first pre-heated thermal treatment compartment into a cooling compartment (of the furnace arrangement, may be provided by a conveyer/conveying system.

The present disclosure further, in a second aspect, relates to a method according to claim 25 for manufacturing vacuum insulating glazings/VIG units, wherein said method comprises the steps of: providing a plurality of first pane elements, applying a soldering material in paste form on a first surface of each first pane elements, along side edges of the first pane elements, where the soldering material is configured for subsequent connection with a second pane element in order to provide a sealing between the outside of the vacuum insulating glazings and an inside void of the vacuum insulating glazings where vacuum is to be provided, moving the first pane elements comprising the soldering material into a thermal treatment compartment, and providing a thermal treatment of the soldering material on the first pane elements, so as to dry out a solvent material from the soldering material, moving the first pane elements from the thermal treatment compartment, and subsequently connecting the first pane elements to second pane elements by means of the dried out soldering material, wherein at least in a step of said thermal treatment, a gas convection treatment process is provided, wherein the gas convection treatment process comprises that the heat exchange between the first pane elements and the thermal treatment compartment is provided by means of a forced convection of a temperature controlled gas, which is supplied to said first surface and/or a second surface of the first pane elements opposite to said first surface of each of the first pane elements by means of a plurality of nozzles of the thermal treatment compartment directed towards said first and/or second surfaces, and wherein the gas supplied during the gas convection treatment process is filtered air which is filtered by a filtering unit before it is supplied towards the first pane elements.

The inventors have realized that it may be advantageous to keep the panes clean, also during initial manufacturing steps relating to manufacturing of VIG units. By utilizing cleansed gas such as filtered, air for the drying and/or cooling, it may firstly provide a cost efficient solution, and moreover, it may provide a solution which may help to reduce the risk of contaminating the surface of the panes. This may advantageous as even minor contaminations of the pane surfaces arranged to face the gap/void in the VIG after evacuation of the gap/void may reduce insulation capabilities over time for the VIG, and even reduce the VIG lifetime.

For example, by cleansing air, such as ambient air, by a filtering unit, this may advantageously be used for the thermal treatment by heating and filtering the air before introducing it to the thermal treatment compartment(s). It may also be utilized for a cooling step as e.g. described in various embodiments in the present disclosure.

In advantageous aspects, the filtering may be provided by a filtering unit such as a filtering unit comprising a High-efficiency particulate arrestance (HEPA) filter.

In advantageous aspects of the second aspect, said forced convection of a temperature controlled gas by the nozzles is provided at an angle a between 3° and 80° to the first and/or second pane surface(s), preferably between 10° and 60° to the first and/or second pane surface(s).

Generally, this may help to force contaminants away from the pane surface(s). Generally, possible contaminants such as dust or other particles in the supplied gas and/or existing in the thermal treatment compartment may affect the vacuum in the VIG after the void of the VIG has been evacuated. By providing the angular gas supply as described above, this may help to force potentially contaminating particles away from the pane surfaces and thus reduce the risk of obtaining a VIG with reduced quality/lifetime due to equalization of the vacuum in the void of the VIG caused by contaminants in the void.

The first nozzles may generally, in aspects of the second aspect (as e.g. described above) second aspect and/or third aspect (as e.g. described further below) be connected to a first piping system that supplies gas to the nozzles providing gas/air to the surface, and the furnace arrangement may in preferred embodiments also comprise a further piping system providing gas to the one or more further nozzles directed towards the surface comprising the soldering material.

It may be preferred that the angular gas supply is at least provided at the surface comprising the soldering material, as this surface is to face the void of the VIG, but it may also be provided to the opposite surface of the VIG by further nozzles in order to try to remove contaminants from this surface that at a later stage may be moved to the surface comprising the soldering material.

In other aspects, the angular gas supply may at least be provided at the surface comprising the soldering material alone, while the gas at the opposite surface by other nozzles may be applied in about 90° to this surface. This may e.g. help to reduce the risk of whirling contaminants at this surface or supplied in the gas towards the surface comprising the soldering material inside the thermal treatment compartment.

It is generally to be understood that the plurality of nozzles of the thermal treatment compartment directed towards said second surfaces may preferably, in aspects, be distributed in the longitudinal direction of the thermal treatment chamber from the inlet of the chamber/compartment to an outlet of the chamber/compartment. Such nozzles may provide a more controlled gas flow and thermal treatment of the pane surface(s).

In aspects of the second aspect, said gas convection treatment process comprises a heating step where forced convection heating is provided to dry out the soldering material.

By drying out the soldering material by forced convection heating to evaporate at least a part of the solvent for example based on alcohol or water from the soldering material, and preferably to leave binder material in the soldering material, a fast thermal treatment may be obtained.

In aspects of the second aspect, the forced convection heating may be provided at a drying temperature between 140° C. and 240° C., such as between 160° C. and 220° C., preferably between 180° C. and 200° C., such as about 190° C., to evaporate solvent from the soldering material, preferably while maintaining the binder material in the soldering material.

Generally, a thermal treatment to dry out the soldering material at the above mentioned temperature result in a fast evaporation of the solvent from the soldering material, thereby enabling increase of the manufacturing process speed of VIG units, and by operating at these temperatures so that the heating is primarily provided at the pane surface opposite to the surface comprising the soldering material, possible issues relating to e.g. shell drying (explained in more details later on in this document)and/or cracks in the dried out soldering material may be reduced.

In preferred aspects of the second aspect, said gas convection treatment process comprises a cooling step where forced convection cooling is provided to cool the first pane elements to a lower temperature.

Providing a thermal treatment where a cooling process is provided by forced convection cooling, preferably subsequently to the above mentioned forced convection heating to dry out the soldering material, so, a faster manufacturing process may be achieved while also reducing the risk of providing undesired contaminants to the surface comprising the soldering material, and also "shell drying" of the soldering material during the cooling process may be reduced.

Moreover, a subsequent handling of the first pane to e.g. connect the first pane to the second pane by means of a holding arrangement such as a suction cup setup or the like grabbing the pane at the second surface may be possible faster as the temperature may faster be reduced to a temperature level where the holding arrangement is able to operate.

Preferably, the soldering material and/or the first pane element has a temperature between 40° C. and 90° C., such as between 50° C. and 70° C., such as about 45° C. to 60° C. after cooling.

The soldering material may in aspects of the present disclosure have a higher temperature than the second surface of the pane element after the cooling by the first convection cooling.

In preferred aspects of the second aspect, said gas convection treatment process comprises a first thermal treatment step and a second thermal treatment step, wherein the first thermal treatment step is a heating step where the soldering material at the first surface is dried out by evaporating solvent from the soldering material by forced convection heating by a convection heating system, and wherein the second thermal treatment step is a cooling step where forced convection cooling is provided by a convection cooling system to cool said soldering material and said first pane elements subsequent to the heating step.

Hereby, one or more of the above advantages are provided, and e.g. a fast dryout and manufacturing process of VIG's may be obtained.

The cooling step after the heating step may generally reduce the risk of contaminating the pane surfaces during cooldown (compared to if the panes are just placed to cool by ambient air for an amount of time), as the first panes may hereby faster be connected to the second panes in that the panes have been brought to a desired temperature fast so that they can be connected to the second pane surfaces.

In preferred aspects of the second aspect, the overall treatment time for the heating step and the cooling step is between 4-15 minutes such as between 5-10 minutes, preferably about 6-9 minutes.

The first pane elements may preferably in aspects of the present disclosure be subjected to the cooling step for about 1-10 minutes, preferably 2-6 minutes. In further aspects, the first pane elements may be subjected to the heating step for about 3-15 min, preferably 4-7 minutes.

In advantageous aspects of the second aspect, a first thermal treatment step may be provided in a first thermal treatment compartment, and a second thermal treatment step may be provided in a second thermal treatment compartment arranged after the first thermal treatment compartment, wherein the first and second thermal treatment compartments are preferably separated by a heat insulating arrangement such as a mechanical partition wall arrangement and/or an air curtain/door.

This may provide a space saving, fast and efficient processing of the first pane elements so that the pane elements are dried out with increased speed by the heating step, and the cooling provides that the panes and the soldering material, when leaving the cooling step, are not too hot to be handled by pane handling equipment such as automation equipment and/or operators. The cooling step may moreover provide that the temperature of the soldering material such as a glass frit material, preferably a lead-free, e.g. vanadium based glass frit material has the desired temperature and is both substantially shape stable and in a resilient/flexible state when leaving the cooling step. This may provide that an enhance coupling with the second pane elements may be obtained.

In preferred aspects, the first and second thermal treatment compartments are arranged in the same furnace arrangement.

Preferably, in aspects of the second aspect, the soldering material and/or the first pane element has a temperature between 40° C. and 90° C., preferably between 55° C. and 80° C., such as about 75° C. after cooling by means of the cooling step.

In aspects of the second aspect, the first pane element may have a temperature between 70° C. and 100° C., after cooling by means of the cooling step, when leaving the cooling compartment/step.

The cooling step may generally help to cool the first panes and the soldering material thereon to the above mentioned temperature range(s) where handling equipment such as automation equipment is able to operate, and thus provide a fast connection of the first and second pane elements after cooling, and preferably also provides that the safety in the manufacturing environment is increased due to the lower pane/soldering material temperature.

Advantageously, the gas convection treatment process may, in aspects of the second aspect, be provided by means of a plurality of first nozzles directed towards said second surfaces, and one or more further nozzles directed towards said first surface comprising the soldering material.

This may e.g. provide a controlled thermal treatment environment when providing a heating step and/or a cooling step. Moreover, it may provide advantageous handling of possible contaminants in the thermal treatment compartment(s), e.g. if the nozzles are angled to provide gas with an angle different from perpendicular to the pane surface, as the first as well as the further nozzles may blow such contaminants away from the respective pane surfaces. Thus, e.g. dust or other particles which may be whirled from the side of the second surface of the respective first pane element by the first nozzles, towards the side of the first surfaces comprising the soldering material, but the further nozzles hence assure that such contaminants are either blown away from the first surface or is kept away from the first surface.

In advantageous aspects of the second aspect, said gas convection treatment process may be provided by means of a forced convection of a temperature controlled gas, by supplying a larger gas flow at the second surface of the pane elements compared to a second gas flow provided simultaneously at the first surface of the first pane elements in said thermal treatment compartment.

The gas convection treatment process may thereby provide that the heat exchange between the first pane elements and the thermal treatment compartment is mainly provided by means of a forced convection of a temperature controlled gas, which is supplied to the second surface of each of the first pane elements.

The thermal treatment compartment may in preferred aspects of the present disclosure comprise one or more nozzles arranged to direct a forced flow of air towards the first surface comprising the soldering material arranged near the edge/periphery of the pane element, and nozzles arranged to direct a flow of air towards the second surface opposite to the first surface. The nozzles directed towards the second surface may thereby be controlled and/or distributed so that they provide a larger gas flow at the second surface of the pane elements compared to the air flow provided at the first surface.

In advantageous aspects of the second aspect, the air provided at the second surface may have a different temperature, such as a higher temperature or a lower temperature than the gas provided at the first surface of the pane elements, whereby the gas convection treatment process may provide that the heat exchange between the first pane elements and the thermal treatment compartment is mainly provided by means of a forced convection of a temperature controlled gas, which is supplied to the second surface of each of the first pane elements.

In an aspect of the second aspect, the heat exchange between the first pane elements and the thermal treatment compartment may mainly be provided by means of a forced convection of a temperature controlled gas during said gas convection treatment process, by providing at least 65%, such as at least 75% of the thermal treatment at the second surface by said plurality of nozzles, compared to the thermal treatment provided at the first surface comprising the soldering material.

In advantageous aspects of the second aspect, the gas flow supplied towards the at the second surface of the pane elements is at least 1.3 times, such as at least 1.5 times, e.g. at least two times, such as at least three times, e.g. at least five times larger than a second gas flow provided, preferably simultaneously by a plurality of further nozzles, at the first surface comprising the soldering material.

This may generally e.g. provided by: providing a higher number of nozzles to blow gas towards the second surface than the number of nozzles arranged to blow gas towards the first surface, and/or increase the gas pressure at the nozzles directed towards the second surfaces compared do the air pressure of the nozzles directed towards the first surfaces.

The thermal treatment compartment may in preferred aspects of the second aspect comprise a conveyer system which conveys the first pane elements through the thermal treatment compartment(s), preferably from an inlet opening to an outlet opening. In further advantageous aspects, the second surface of the first pane elements may support on one or more conveyer elements of the conveyer system, and the forced convection of a temperature controlled gas supplied to the second surface of each of the first pane elements by the plurality of nozzles is provided between or through the one or more conveying elements.

The one or more conveyer elements may comprise a roller conveyer system comprising a plurality of rollers for supporting and transporting the first panes, an endless chain drive or conveyer belt and/or the like.

In preferred aspects of the second aspect, the first and second pane elements are made from tempered glass. Pane elements made from tempered glass has an improved strength compared to non-tempered glass panes, and thus, the distance between the pillars in the void/gap of the VIG may be increased. The present disclosure may be especially advantageous for providing thermal treatment of tempered glass for VIGs in order to increase the lifetime of the end product (i.e. a VIG pane element/unit with an evacuated vacuum) and/or to obtain an increased manufacturing speed because tempered glass bodies can withstand higher temperature differences without failure.

In aspects of the second aspect, the forced gas convection by the nozzles may be provided at an angle between 3° and 70° to the first and/or second pane surface(s), preferably between 10° and 60° to the first and/or second pane surface(s).

Generally, by providing the angular gas supply as e.g. described above or below, this may help to force potentially contaminating particles away from the pane surfaces and thus reduce the risk of obtaining a VIG with reduced quality/lifetime due to an undesired equalization of the vacuum in the void of the VIG.

In preferred aspects of the second aspect, the method is provided by/in a substantially continuous manufacturing process comprising a first manufacturing line for preparing the first pane elements, and a second manufacturing process for preparing the second pane elements, wherein the first manufacturing line provides the gas convection treatment process, and wherein the second manufacturing line provides a preparation of the second pane elements for connecting to the first pane elements, wherein the first and second manufacturing lines are substantially parallel processes.

This may help to increase the overall manufacturing speed of VIG units with an evacuated void, and/or may help to provide a less space consuming manufacturing setup.

The second manufacturing line may in aspects of the second aspect comprise a pillar placing process where a pillar placement arrangement distributes and places a plurality of pillars on an upper surface of the second pane elements, the pillar placement arrangement may generally, according to aspects, comprise a pick and place solution where one or more robotic arms places the pillars. It is however generally understood that in further aspects of the present disclosure, the pillar placing may include "printing" the pillars onto the surface of a pane element such as the first and/or second pane element. Preferably, the printed pillars will however be printed on the first pane elements comprising the soldering material for the edge seal at the first surface of the first pane elements, as the printed pillars may thus dry out together with the soldering material for the edge seal in the thermal treatment compartment(s).

In preferred aspects of the second aspect, the soldering material on the first pane element (10) may comprise: at least 50% by weight of glass frit, based on the total weight of the soldering material; a binder material, and a solvent, when in said paste form to be applied at the first surface of the first pane element.

For example, the soldering material on the first pane element may in aspects comprise: between 60 wt % and 85 wt % glass frit; between 1 wt % and 6 wt % Binder material and other additives; and between 14 wt % and 34 wt % solvent, when in said paste form to be applied at the first surface of the first pane element.

In preferred aspects of the second aspect of the present disclosure, the amount of solvent in the soldering material after the gas convection treatment process is less than 3%, preferably less than 1%, such as less than 0.5%, e.g. less than 0.1%.

In preferred aspects of the second aspect of the present disclosure, the volume of the soldering material has decreased by between 30% and 60% such as between 37% and 50%, e.g. around 40%-45% after the gas convection treatment process.

The volume of the soldering material may in other aspects of the present disclosure have decreased by between 3% and 40% such as between 6% and 20%, e.g. around 7%-10% after the gas convection treatment process.

In preferred aspects of the second aspect of the present disclosure, the method according to the second aspect of the present disclosure may furthermore comprise the method or steps of one or more of claims 1-24 and/or one or more of claims 48-69.

The present disclosure additionally, in a third aspect, relates to a method for manufacturing vacuum insulating glazings, wherein said method comprises the steps of: providing a plurality of first pane elements, applying a soldering material in paste form on a first surface of each first pane elements, along side edges of the first pane elements, where the soldering material is configured for subsequent connection with a second pane element in order to provide a sealing between the outside of the vacuum insulating glazings and an inside void of the vacuum insulating glazings where vacuum is to be provided, moving the first pane elements comprising the soldering material into a thermal treatment compartment, and providing a thermal treatment of the soldering material on the first pane elements, so as to dry out a solvent material from the soldering material, moving the first pane elements from the thermal treatment compartment, and subsequently connecting the first pane elements to second pane elements by means of the dried out soldering material, wherein at least in a step of said thermal treatment, a gas convection treatment process is provided, wherein the gas convection treatment process comprises that the heat exchange between the first pane elements and the thermal treatment compartment is mainly provided by means of a forced convection of a temperature controlled gas, which is supplied to the second surface of each of the first pane elements.

In the above mentioned third aspect, the thermal treatment is mainly/primarily provided at the second surface opposite to the first surface comprising the soldering material. A forced gas convection for the heat treatment may be advantageous but may increase risk of contaminating the surface of the pane elements exposed to the heating. However, the second surface will not in the end face the interior void of the VIG unit, and thus an increased thermal treatment of this surface by forced gas convection compared to the thermal treatment at the surface comprising soldering material and to face the interior void is of much less concern as a contamination of this surface will not influent on the vacuum in the void.

Accordingly, the present disclosure may provide a solution where the VIG unit produced by the above mentioned solution may maintain the desired vacuum in the void/gap of the VIG for a longer time, as the solution reduces the risk of contaminating the surface of the pane to face the void.

Moreover, the solution according to the third aspect may provide a more advantageous treatment of the soldering material when utilizing thermal treatment of the soldering material by forced gas convection. Forced gas convection such as forced convection heating and/or forced convection cooling provides fast/increased and efficient energy heat energy transfer or heat energy consumption to/from the panes and the soldering material, and may also help to provide a more uniform temperature in the thermal treatment compartment. However, the forced air/gas flow provided by the forced air convection may result in some undesired effects on the soldering material. For example, the air/gas flow provided by the forced gas convection originating from the nozzles may tend to dry out the outer surface of the soldering material too fast, thereby resulting in an undesirable "shell drying" of the soldering material. This provides that the internal of the soldering material between this "shell" and the pane surface supporting the soldering material may not be sufficiently treated to dry out the soldering material sufficiently. This may in the end affect the VIG unit quality as contaminants such as e.g. shell parts or dust may be released from the soldering material at a later stage after the soldering material has been treated to provide a solid edge/periphery seal, and vacuum is applied. Because the mass and volume of the soldering material is reduced during drying, it is may be advantageous to have the dry out controlled throughout the solder material body to allow the solder material to set properly during dry out. Moreover, it may result in a non-uniform drying result of the soldering material which may also have impact on the needed treatment time at a later stage in the VIG manufacturing.

The solution according to the third aspect may provide a solution to this problem, or at least reduce this potential problem, as the thermal treatment is primarily provided by directing gas at the second of each pane elements surface opposite to the first surface comprising the soldering material. The thermal treatment may hereby result in that the temperature of the first pane is faster brought to the desired temperature level in order to also obtain the desired temperature of the soldering material nearest to the first pane surface, thereby allowing the soldering material to be thermally treated from both the side of the soldering material facing the pane and the surface facing away from the pane. This may help to provide that components of the soldering material which are undesired at a later stage of the VIG manufacturing process, is/are sufficiently removed.

It is generally to be understood that the Vacuum Insulated Glazing as referred to in this document are preferably configured for placement in a frame, such as a window frame, door frame or the like, and subsequently placed in an aperture of a building in order to allow light from the outside of the building to enter through the vacuum insulated glazing to the inside of the building.

In general, it may be preferred, in relation to the third aspect, that a higher amount of gas, measured in $m^3$/hour is directed towards the second surface when compared to the amount of gas, measured in $m^3$/hour provided at the first surface comprising the soldering material, so that the second surface is exposed to a larger/increased gas flow than the first surface during the gas convection treatment process.

The soldering material on the first pane elements is preferably configured for providing an edge seal between the pane elements when connecting the first and second pane elements.

In an advantageous aspect of the third aspect, the forced convection of a temperature controlled gas provided during the gas convection treatment process is supplied to the second surface of each of the first pane elements by means of a plurality of nozzles of the thermal treatment compartment directed towards said second surfaces.

The plurality of nozzles of the thermal treatment compartment directed towards said second surfaces are preferably distributed in the longitudinal direction LD of the thermal treatment chamber from the inlet of the chamber/compartment to an outlet of the chamber/compartment. Such nozzles may provide a more controlled gas flow and thermal treatment of the surface.

Preferably, in aspects of the third aspect of the present disclosure, said gas convection treatment process comprises a heating step where forced convection heating is provided to dry out the soldering material.

By drying out the soldering material by forced convection heating to evaporate at least a part of the solvent for example based on alcohol or water from the soldering material, and preferably to leave binder material in the soldering material, a fast thermal treatment may be obtained.

Additionally, a fast drying of the soldering material by convection heating may risk that cracks originates in the frit during dryout. This may increase the risk of reduced strength and/or tightness of the soldering material, which in the end may affect the lifte time of the VIG unit or even provide that a sufficient vacuum in the void cannot be provided during manufacturing. This issue may however be reduced if the forced convection heating during the gas convection treatment process, as described in connection with the third aspect, is mainly provided at the second surface of each of the first pane elements. This may in the end help to increase the yield of VIG units having a sufficient quality.

The forced convection heating may e.g., in aspects of the present disclosure be provided at a drying temperature between 140° C. and 240° C., such as between 160° C. and 220° C., preferably between 180° C. and 200° C., such as about 190° C. to evaporate solvent from the soldering material, preferably while maintaining the binder material in the soldering material.

A thermal treatment to dry out the soldering material at the above mentioned temperature result in a fast evaporation of the solvent from the soldering material, thereby enabling increase of the manufacturing process speed of VIG units.

The gas convection treatment process may in aspects of the third aspect comprise a cooling step where forced convection cooling is provided to cool the first pane elements to a lower temperature. Providing a thermal treatment where a cooling process is provided by forced convection cooling, preferably subsequently to the above mentioned forced convection heating to dry out the soldering material, so as to cool the first pane and the soldering material thereon, and so that the cooling is e.g. primarily provided at the second surface opposite to the first surface comprising the soldering material, a faster manufacturing process may be achieved while also reducing the risk of providing undesired contaminants to the surface comprising the soldering material, and also the risk of "shell drying" of the soldering material during the cooling process may be reduced. Moreover, a subsequent handling of the first pane to e.g. connect the first pane to the second pane by means of a holding arrangement such as a suction cup setup or the like grabbing the pane at the second surface may be possible faster as the temperature may faster be reduced to a temperature level where the holding arrangement is able to operate. This is even while the soldering material has a higher temperature than the pane due to the primary cooling at the second surface.

Preferably, the soldering material and/or the first pane element has a temperature between 40° C. and 100° C., e.g. between 40° C. and 90° C., such as between 50° C. and 70° C., such as about 45° C. to 60° C. after cooling.

The soldering material may generally, in aspects of the third aspect, have a higher temperature than the second surface of the pane element after the cooling by the convection cooling. This may however not affect the manufacturing of VIGs when arranging the first and second panes together, as the handling equipment for arranging the panes opposite to each other may preferably grab the second surface of the first pane.

In preferred aspects of the third aspect, said gas convection treatment process may comprise a first thermal treatment step and a second thermal treatment step, wherein the first thermal treatment step is a heating step where the soldering material at the first surface is dried out by evaporating solvent from the soldering material by forced convection heating by a convection heating system, and wherein the second thermal treatment step is a cooling step where forced convection cooling is provided by a convection cooling system to cool said soldering material and said first pane elements subsequent to the heating step.

Hereby, one or more of the above advantages may be provided, and e.g. a fast dryout and manufacturing process of VIG's may be obtained.

It is generally understood that the cooling step after the heating step may reduce the risk of contaminating the pane surfaces during cooldown, as the first panes may hereby faster be connected to the second panes in that the panes have been brought to a desired temperature fast so that they can be connected to the second pane surfaces.

Advantageously, in aspects of the third aspect, the overall treatment time for the heating step (S1) and the cooling step (S2) is between 4-15 minutes such as between 5-10 minutes, preferably about 6-9 minutes.

The first pane elements may preferably in aspects of the third aspect be subjected to the cooling step for about 1-10 minutes, preferably 2-6 minutes.

The first pane elements may preferably in aspects of the third aspect be subjected to the heating step for about 3-15 min, preferably 4-7 minutes.

Preferably, in aspects of the third aspect, the first thermal treatment step may be provided in a first thermal treatment compartment, and the second thermal treatment step may be provided in a second thermal treatment compartment arranged after the first thermal treatment compartment, wherein the first and second thermal treatment compartments are preferably separated by a heat insulating arrangement such as a mechanical partition wall arrangement and/or an air curtain/door.

This may provide a space saving, fast and efficient processing of the first pane elements so that the pane elements are dried out with increased speed by the heating step, and the cooling provides that the panes and the soldering material, when leaving the cooling step, are not too hot to be handled by pane handling equipment such as automation equipment and/or human operators. The cooling step may moreover provide that the temperature of the soldering material such as a glass frit material, preferably a lead-free, e.g. vanadium based glass frit material has the desired temperature and is both substantially shape stable and in a resilient/flexible state when leaving the cooling step. This may provide that an enhance coupling with the second pane elements may be obtained.

The first and second thermal treatment compartments may thus generally, in aspects, preferably be arranged abutting, separated by the heat insulating arrangement.

In preferred aspects, the first and second thermal treatment compartments are arranged in the same furnace arrangement.

The soldering material and/or the first pane element may preferably, in aspects of the third aspect of the present disclosure, have a temperature between 40° C. and 90° C., preferably between 55° C. and 80° C., such as about 75° C. after cooling by means of the cooling step.

The cooling step may thus cool the first panes and the soldering material thereon to the abovementioned temperature range(s) where handling equipment such as automation equipment is able to operate, and also provides that the safety in the manufacturing environment/location is increased due to the lower pane/soldering material temperature.

In advantageous aspects of the third aspect, the gas convection treatment process may be provided by means of a plurality of first nozzles directed towards said second surfaces, and one or more further nozzles directed towards said first surface comprising the soldering material.

Generally this may e.g. provide a controlled thermal treatment environment when providing a heating step and/or a cooling step. Moreover, it may provide advantageous handling of possible contaminants in the thermal treatment compartment(s), as the first as well as the further nozzles may blow such contaminants away from the respective pane surfaces. Thus, e.g. dust or other particles which may be whirled from the side of the second surface of the respective first pane element by the first nozzles, towards the side of the first surfaces comprising the soldering material, but the further nozzles hence assure that such contaminants are either blown away from the first surface or is kept away from the first surface.

The first nozzles may generally, in aspects of the present disclosure, be connected to a first piping system that supplies gas to the nozzles providing gas/air to the surface, and the furnace arrangement may in preferred embodiments also comprise a further piping system providing gas to the one or more further nozzles directed towards the surface comprising the soldering material.

In preferred aspects of the third aspect, said gas convection treatment process may be provided by means of a forced convection of a temperature controlled gas, by supplying a larger gas flow at the second surface of the pane elements compared to a second gas flow provided simultaneously at the first surface of the first pane elements in said thermal treatment compartment.

The gas convection treatment process may hereby provide that the heat exchange between the first pane elements and the thermal treatment compartment is mainly provided by means of a forced convection of a temperature controlled gas, which is supplied to the second surface of each of the first pane elements.

The thermal treatment compartment may in preferred aspects comprise one or more nozzles arranged to direct a forced flow of air towards the first surface comprising the soldering material arranged near the edge/periphery of the pane element, and nozzles arranged to direct a flow of air towards the second surface opposite to the first surface. The nozzles directed towards the second surface may thereby, in accordance with aspects of the third aspect, be controlled and/or distributed so that they provide a larger gas flow at the second surface of the pane elements compared to the air flow provided at the first surface.

In other advantageous aspects of the third aspect, the air provided at the second surface may have a different temperature, such as a higher temperature or a lower temperature than the gas provided at the first surface of the pane elements, whereby the gas convection treatment process provides that the heat exchange between the first pane elements and the thermal treatment compartment is mainly provided by means of a forced convection of a temperature controlled gas, which is supplied to the second surface of each of the first pane elements.

In an aspect of the third aspect, the heat exchange between the first pane elements and the thermal treatment compartment is mainly provided by means of a forced convection of a temperature controlled gas during said gas convection treatment process, by providing at least 65%, such as at least 75% of the thermal treatment at the second surface by said plurality of nozzles, compared to the thermal treatment provided at the first surface comprising the soldering material.

In advantageous aspects of the third aspect, the gas flow supplied towards the at the second surface of the pane elements may be at least 1.3 times, such as at least 1.5 times, preferably at least two times, such as at least three times, e.g. at least five times larger than a second gas flow provided, preferably simultaneously, by a plurality of further nozzles, arranged to provide a heat treatment at the first surface comprising the soldering material. This may e.g. provided by: providing a higher number of nozzels to blow gas towards the second surface than the number of nozzles arranged to blow gas towards the first surface, and/or increase the gas pressure at the nozzles directed towards the second surfaces compared do the air pressure of the nozzles directed towards the first surfaces.

In preferred aspects of the third aspect of the present disclosure, the thermal treatment compartment(s) may comprises a conveyer system which is configured to convey the first pane elements through the thermal treatment compartment(s), preferably from an inlet opening to an outlet opening. In further advantageous aspects, the second surface of the first pane elements may support on one or more conveyer elements of the conveyer system, and the forced convection of a temperature controlled gas supplied to e.g. the second surface of each of the first pane elements, preferably by a plurality of nozzles, may be provided between or through the one or more conveying elements.

The one or more conveyer elements may comprise a roller conveyer system comprising a plurality of rollers for supporting and transporting the first panes, an endless chain drive or conveyer belt and/or the like.

In preferred aspects of the third aspect, the gas supplied during the gas convection treatment process, e.g. by nozzles, is cleansed air such as filtered air which is filtered by a filtering unit before it is supplied towards the first pane elements.

Hereby, e.g. ambient air may be used for the thermal treatment by heating and filtering the air before introducing it to the thermal treatment compartment(s)

In preferred aspects of the third aspect, the first and second pane elements are made from tempered glass.

Pane elements made from tempered glass has an improved strength compared to non-tempered glass panes, and thus, the distance between the pillars in the void of the VIG may be increased. The present disclosure may be especially advantageous for providing thermal treatment of tempered glass for VIGs in order to increase the lifetime of the end product (i.e. a VIG pane element/unit with an evacuated vacuum) and/or to obtain an increased manufacturing speed because tempered glass bodies can withstand higher temperature differences without failure.

In advantageous aspects of the third aspect, the forced gas convection, preferably by means of one or a plurality of nozzles, may be provided at an angle between 3° and 70° to the first and/or second pane surface(s), preferably between 10° and 60° to the first and/or second pane surface(s).

By providing the angular gas supply as described above, this may help to force/blow potentially contaminating particles away from the pane surfaces and thus reduce the risk of obtaining a VIG with reduced quality/lifetime due to equalization of the Vacuum in the void of the VIG.

In a preferred aspect of the third aspect, said method may be provided by/in a substantially continuous manufacturing process comprising a first manufacturing line for preparing the first pane elements, and a second manufacturing process for preparing the second pane elements, wherein the first manufacturing line provides the gas convection treatment process, wherein the second manufacturing line provides a preparation of the second pane elements for connecting to the first pane elements, and wherein the first and second manufacturing lines are substantially parallel processes.

The this may result in a faster manufacturing speed of first pane elements with dried out soldering material which may increase the overall manufacturing speed of VIG units with an evacuated void/gap, and/or may help to provide a less space consuming manufacturing setup.

The second manufacturing line may in aspects comprise a pillar placing process where a pillar placement arrangement distributes and places a plurality of pillars on an upper surface of the second pane elements.

In further or alternative aspects, the pillar placing may include "printing" the pillars onto the surface of a pane element such as the first and/or second pane element by a soldering material such as glass frit or the like. Preferably, the printed pillars of soldering material will however be printed on the first pane elements comprising the soldering material for the edge seal at the first surface of the first pane elements, as the printed pillars may thus dry out together with the soldering material for the edge seal in the thermal treatment compartment(s).

Preferably, in aspects of the third aspect of the present disclosure, the soldering material on the first pane element(s) may comprises: at least 50% glass frit; a binder material, and solvent, when in said paste form to be applied at the first surface of the first pane element.

The soldering material on the first pane element may in further aspects of the present disclosure comprise: between 60 wt % and 85 wt % glass frit, between 1 wt % and 6 wt % binder material and other additives, and between 14 wt % and 34 wt % solvent, when in said paste form to be applied at the first surface of the first pane element.

In preferred aspects of the third aspect, the amount of solvent in the soldering material after the gas convection treatment process is less than 3%, preferably less than 1%, such as less than 0.5%, e.g. less than 0.1%.

Preferably, in aspects of the third aspect, the volume of the soldering material on the first pane elements has decreased by between 30% and 60% such as between 37% and 50%, e.g. around 40%-45% after the gas convection treatment process compared to the volume of the soldering material on the pane before subjecting the pane to the gas convection treatment process.

It is to be understood that one or more advantages or features provided by means of an aspect described in relation to the first second or third aspect may additionally be obtained by in one or more of the other of the first, second or third aspect.

It is generally understood that with the term tempered glass pane may herein be understood glass panes in which compressive stresses have been introduced in the surface of the glass pane, and the centre of the glass pane consequently is subject to tensile stress. For glass to be considered tempered this compressive stress on the surface of the glass should be a minimum of 69 MPa (10,000 psi) and is usually higher than 95 MPa and up to about 150 MPa.

Tempered glass, also known as toughened glass, may be produced from annealed glass by means of a strengthening procedure, which e.g. may be a heat tempering, a chemically tempering, or plasma tempering with the purpose of introducing the compressive stresses into the surfaces of the glass pane. Other types of tempering of glass include ion treatment or bombardment of the glass pane surfaces with large atoms, which becomes embedded in the surface deposition of material on the glass pane surface by means of surface treatment or bombardment and surface chemical reactions for obtaining the compressive stresses at the glass pane surface.

Thermally tempered glass may be produced by means of a furnace in which the annealed glass is heated to a temperature of approximately 700° C., after which the glass pane is rapidly cooled. The cooling introduces the compressive stresses into the glass pane surface.

A chemical tempering process involves chemical ion exchange of at least some of the sodium ions in the glass pane surface with potassium ions by immersion of the glass pane into a bath of liquid potassium salt, such as potassium nitrate. The potassium ions are about 30% larger in size than the replaced sodium ions which cause the material at the glass pane surfaces to be in a compressed state.

Plasma tempering of glass panes resembles the chemical tempering process in that sodium ions in the surface layers of the glass pane are replaced with other alkali metal ions so as to induce surface compressive stresses in the glass pane, the replacement is however made by means of plasma containing the replacement ions. Such method may be conducted by using a plasma source and first and second electrodes disposed on opposing major surfaces of a glass pane, wherein the plasma comprises replacement ions, such as potassium, lithium or magnesium ions, whereby the replacement ions are driven into the opposing surfaces of the glass pane so as to increase the strength of the pane. Methods of plasma tempering are disclosed e.g. in US 2013/0059087 A1 and in US 2013/0059160 A1.

After tempering, the stress pattern developed by the glass is high, and the mechanical strength of tempered glass is typically four to five times higher than that of annealed glass.

Generally, in relation to the first, second and/or third aspects as described above, it is understood that two separate air supply systems may in aspects of the respective disclosure/aspect be utilized in order to obtain that the heat exchange between the first pane elements and the thermal treatment compartment is mainly/primarily provided by means of a forced convection of a temperature controlled gas supplied to the second surface of each of the first pane elements by means of the plurality of nozzles directed towards the second surfaces.

Generally, the first, second and/or third aspects as described above may be utilized during production of manufacturing vacuum insulating glazings with a pressure in the internal void about 1E-5 bar-1E-7 bar, e.g. about 1E-6 bar, and preferably for use in windows for apertures of buildings.

Generally, in aspects of the first, second and/or third aspects as described above and/or in the claims, the furnace arrangement may comprises or be connected to one or more ventilators for providing a gas flow through a piping system and into the one or more thermal treatment compartments, preferably through nozzles. The one or more ventilators may thus, in advantageous aspects, blow or suck air into an air inlet where the air is cleansed by a filtering unit, before it is supplied towards the first pane elements.

It is generally understood that in aspects where a heating and a cooling step is provided, the system for providing convection heating and the system for providing cooling may comprise separate heating units, and/or separate filtering units or alternatively a common/shared filtering unit so that gas supply to both heating and cooling system receives gas through the same filtering unit. In further aspects the convection heating and cooling may be provided by separate ventilators or alternatively common ventilators so that gas supply to both the heating and cooling system receives gas by means of the same ventilator.

Generally, it is to be understood that the conveyer/conveying system as described above in relation to the various aspects, such as the first, second and/or third aspect, may be of any suitable type for transporting the first pane elements during dry out of the soldering material. For example, the conveying system may comprise one or more conveyer elements, e.g. comprising a plurality of rollers for supporting and transporting the first panes, an endless chain drive or conveyer belt and/or the like. In further aspects, the conveyer/conveying system may be of a type where the pane elements hangs from one or more conveyer elements, e.g. substantially vertically.

Turning now to the drawings, one or more exemplary embodiments are described in further detail.

FIG. 1 schematically illustrates a furnace arrangement 5 according to embodiments of the present disclosure.

The furnace arrangement 5 comprises a thermal treatment compartment 11 and gas supply piping system 41, 51 for supplying temperature controlled gas into the thermal treatment compartment 11 in order to provide a thermal treatment of pane elements 10 for VIG's (Vacuum insulated glazings) in the compartment 11.

The furnace arrangement 5 comprises one or more ventilators 43, 53, in this case two ventilators, for providing a gas flow through the piping system 41, 51 and into the compartment through nozzles 12, 13.

The ventilators blow/suck air into an air inlet 42, 52, where the air is cleansed by a filtering unit 6, before it is supplied towards the first pane elements 10. The filtering unit 6 may comprise any suitable filtering arrangement, e.g. a High-efficiency particulate arrestance (HEPA) filter. In alternative embodiments, the gas may be an inert gas such as argon or nitrogen or a gas composition comprising one or more inert gasses stored in a container (not illustrated) in order to reduce or prevent oxidation of the surfaces of the glass panes.

The air to be supplied to the compartment 11 is controlled by a heating unit 44, 54 comprising one or more heating elements that heats the air before it enter the thermal treatment chamber/compartment 11.

The thermal treatment compartment 11 is enclosed by walls 17 which preferably comprises heat insulation such as e.g. mineral wool, a PIR and/or PUR insulation material or the like in order to provide a thermal insulation between the compartment 11 and the exterior of the furnace arrangement 5.

As illustrated, the thermal treatment chamber 11 comprises a plurality of nozzles 13, 12 distributed in the longitudinal direction LD of the thermal treatment chamber 11 from the inlet 15 of the chamber 11 to the outlet 16 of the chamber 11. Accordingly, the nozzles 12, 13 supplies air towards pane surfaces 3, 4 of first pane elements 10 moving through the inlet 15, through the chamber 11 towards the outlet 16.

The nozzles 12, 13 comprises a plurality of first nozzles 12 directed towards a second surface 4 of the pane elements 10, and further nozzles 13 directed towards the first surface 3 of the pane elements 10. The first surfaces 3 faces upwards and comprises a soldering material 2 that was applied in paste form along side edges of the first pane elements 10 before entering the compartment 11. The soldering material 2 is configured for subsequent connection with a surface of second pane elements in order to provide a sealing between the outside of the vacuum pane and an inside void of the vacuum pane where vacuum is to be provided as explained in more details later on.

Preferably, the plurality of nozzles 12 of the thermal treatment compartment directed towards the second surfaces 4 of the first pane elements 10 comprises at least five such as at least ten, e.g. at least twenty such as at least fifty nozzles distributed in the longitudinal direction of the thermal treatment compartment. For example the plurality of nozzles of the thermal treatment compartment may comprise between 2 and 100 nozzles, such as between 5 and 25 nozzles. The nozzles 12, and in embodiments also further nozzles 13, may comprise a plurality of oblong nozzles extending in the longitudinal direction LD of the chamber 11, it may comprise a plurality of oblong nozzles extending transverse to the longitudinal direction LD and/or it may comprise a plurality of round air nozzles. In embodiments of the present disclosure where both a cooling step and a heating step is provided, and this is done in different thermal treatment compartments as e.g. described later on in this document, each of these compartments may comprise an amount of nozzles according to the above mentioned.

The thermal treatment compartment 11 comprises a conveyer system which conveys the first pane elements 10 through the thermal treatment compartment the inlet opening 15 to the outlet opening 16 in the longitudinal direction LD of the thermal treatment compartment 11.

The second surface 4 of the first pane elements 10 accordingly supports on one or more conveyer elements 7 of the conveyer system so that the pane surfaces 3, 4 are substantially horizontally arranged when transported through the thermal treatment compartment 11.

Generally, it is preferred that the first pane elements 10 moves continuously through the compartment 11 during the gas convection treatment process in the compartment 11, but alternatively, the panes 10 may be moved into the compartment 11, be kept there for a predefined amount of time in a still-standing position before moved towards the outlet 16. Generally, the movement through the compartment 11 may preferably be controlled by the conveyer system.

The forced convection of a temperature controlled gas/air supplied to the second surface 4 of each of the first pane elements 10 by the gas flow 40 directed towards the second surfaces 4 by the plurality of nozzles 12 is provided between the one or more conveying elements 7 which in the present example are roller conveyers. At least some of these roller conveyers 7 are rotated by a drive arrangement such as an electric motor (not illustrated). In other embodiments of the present disclosure, the conveyer system comprises a conveyer element in the form of one or more endless chain drive, a conveyer belt and/or the like (not illustrated), and in such an embodiment, the nozzles 12 may supply the gas through openings of the conveyer element(s) on which the pane elements 10 support.

A gas convection treatment process is provided in the thermal treatment compartment 11, where the gas convection treatment process comprises that the heat exchange between the first pane elements 10 and the thermal treatment compartment 11 is mainly/primarily provided by means of a forced convection of a temperature controlled gas, which is supplied to the second surface 4 of each of the first pane elements 10 by means of the nozzles 12 of the thermal treatment compartment 11 directed towards said second surfaces 4 of the pane elements 10. These nozzles 12 may also, generally be referred to as ""primary" nozzles 12. Thereby an increased thermal energy transfer is obtained at the second pane surfaces 4 of the first panes 10 when compared to the thermal energy transfer provided at the surface 3 of the first pane elements 10 comprising the soldering material 2.

This may be provided in different ways, 11. For example, the gas flow 40, supplied towards the second surface 4 by the nozzles 12 from below of the first pane elements 10 may be provided to the nozzles 12 by a second gas supply system 41 such as a second piping system, and the gas 50 to be supplied to the first surface 3 comprising the soldering material may be provided to the nozzles 13 by a first gas supply system 51 such as a first piping system. These gas flows 40, 50 may be individually controlled by a control arrangement CA of the furnace arrangement 5, in order to e.g. provide different amounts of gas towards the pane surfaces 4, 3, in order to e.g. provide gas with different temperatures towards the pane surfaces 4, 3 respectively and/or the like during transportation of the pane elements 10 through the thermal treatment compartment 11.

The control arrangement CA may also control the temperature of the gas flow 40, 50 by controlling one or more heating units 44, 54. This may be provided so as to either obtain the same temperature in both gas flows 40, 50 and provide the increased thermal energy transfer at the second pane surfaces 4 of the first panes 10 when compared to the thermal energy transfer provided at the surface 3 of the first pane elements 10 by providing a larger gas flow 40 to the second pane surface 4 compared to the gas flow 50 provided to the surface 3.

Alternatively different temperatures in the gas flows 40, 50 may be provided to obtain an increased thermal energy transfer at the second pane surfaces 4 of the first panes 10 when compared to the thermal energy transfer provided at the surface 3 of the first pane elements 10 comprising the soldering material 2. Which temperature that is the higher one of gas flow 40 and 50 respectively may e.g. depend on if the gas convection treatment process is used for a heating step or a cooling step as described in more details later on. If it is used for heating, the temperature of gas flow 40 may be higher than the temperature of gas flow 50. If it is used for cooling, the temperature of gas flow 50 may be higher than the temperature of gas flow 40.

Figure 2:
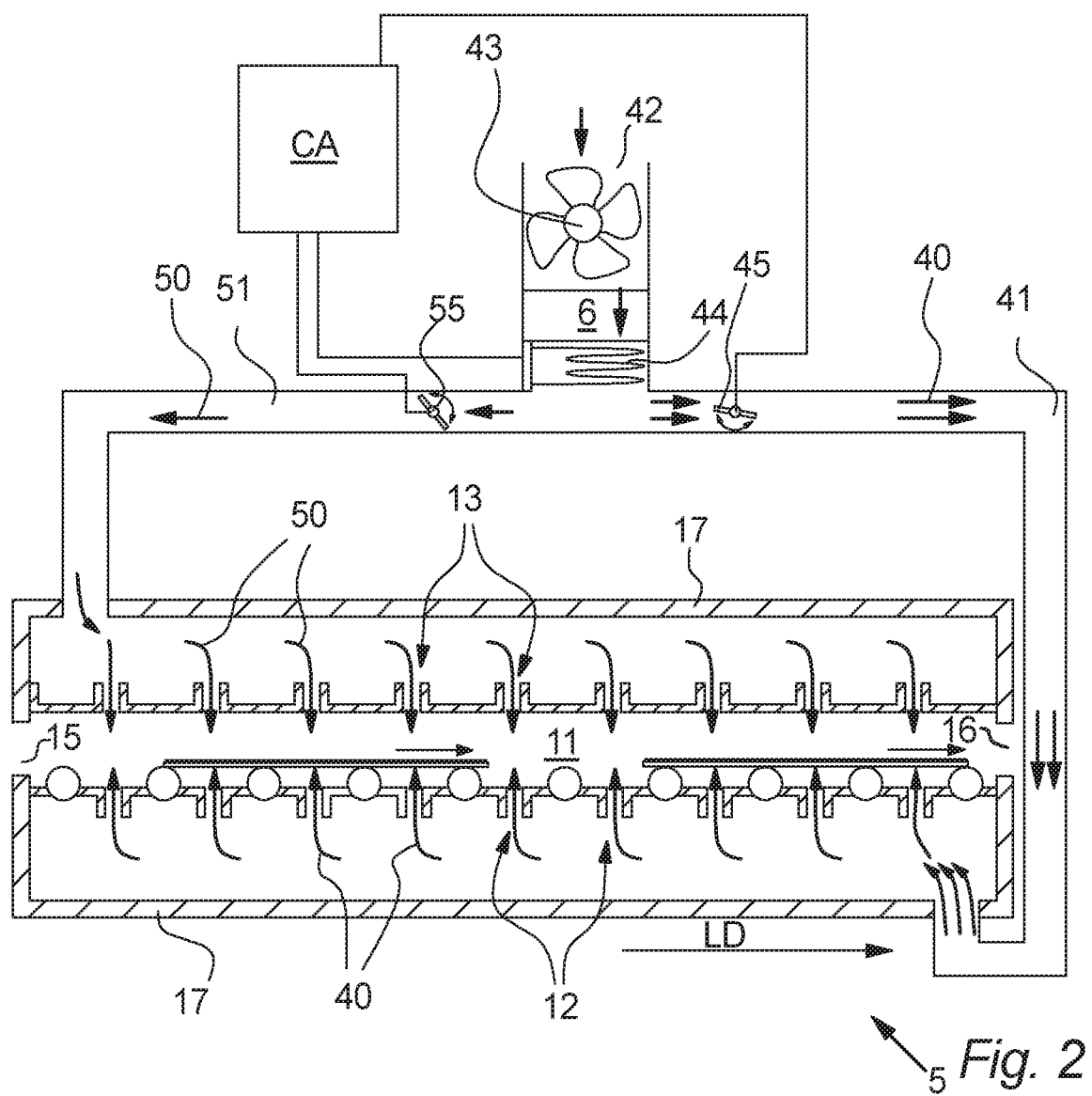
FIG. 2 illustrates schematically a gas convection treatment process according to further aspects of the present disclosure.

In the example of FIGS. 1 and 2, two different air/gas supply piping systems 41, 51 are utilized in order to obtain that the heat exchange between the first pane elements 10 and the thermal treatment compartment 11 is mainly/primarily provided by means of a forced convection of a temperature controlled gas supplied to the second surface of each of the first pane elements 10 by means of the plurality of nozzles 12 directed towards the second surfaces 4. The nozzles 12 are thus connected to a first piping system 41 that supplies gas to the nozzles 12 providing gas/air to the surface 4, and the furnace arrangement 5 may in preferred embodiments also comprise a further piping system 51 providing gas to one or more nozzles 13 directed towards the surface 3 comprising the soldering material 2.

The system in FIG. 1 comprises separate heating units 54, 44, separate filtering units 6, and separate ventilators 43, 53 but the heating units may in aspects of the present disclosure also be a common heating unit outputting gas at the same temperature to both gas supplies 40, 50, The filtering unit 6 may be a common filtering unit for both gas supplies 40, 50, and/or the ventilator arrangement may comprise a common ventilator for both gas supplies 40, 50.

The gas flow towards the second surfaces 4 may e.g. be increased by providing different control signals to the ventilators 43, 53 respectively. For example, the control arrangement CA may transmit different control signals 61, 62, this may e.g. comprise that different power supplies are provided to the ventilators 53, 43 respectively. The control arrangement CA may thus e.g. comprise variable-frequency drives (not illustrated) configured to adjust ventilator rotor speed by supplying different input frequency and/or voltage to the ventilators 53, 43.

The gas convection treatment process in the furnace compartment 11 preferably comprises a heating step where forced convection heating is provided to dry out the soldering material, it is preferred that this convection heating is provided at a drying temperature between 140° C. and 240° C., such as between 160° C. and 220° C., preferably between 180° C. and 200° C., such as about 190° C. to evaporate solvent from the soldering material, while maintaining the binder material in the soldering material. The heating unit(s) 44, 54 thus heats the temperature of the supplied gas to the desired temperature before the gas is supplied into the compartment 11.

Alternatively or additionally, the gas convection treatment process in compartment 11 may comprises a cooling step where forced convection cooling is provided to cool the first pane elements to a lower temperature, again this cooling may be controlled by the heating unit 44, which may however also comprise a cooling unit in order to assure that the supplied cooling air is at the desired temperature level in order to obtain a desired temperature of the pane elements 10 and/or soldering material when leaving through the outlet 16.

FIG. 2 illustrates an embodiment of the present disclosure where the heating unit 44, ventilator arrangement 43 and filtering unit 6 are shared. The gas thus enters the air inlet 42, passes through a filtering unit 6, and passes the heating unit 44 before the gas flow is separated into the first and second gas flows 40, 50. The gas flow is here controlled so that a larger amount of gas is supplied towards the second pane surfaces 4 by means of a second valve 45, and the flow of gas provided towards the first surface 3 comprising the soldering material 2 is controlled by a first valve 55. The control arrangement CA may thus as illustrated transmit control signals to the respective valves 45, 55 and thereby adjust the flow in the respective gas supply systems 41, 42.

It is generally to be understood that the filtering by the filtering unit(s) 6, heating by the heating unit(s) 44, 54 and/or gas flow generation by the ventilator(s) 43, 53 as e.g. illustrated in FIGS. 1 and 2 may be provided in any suitable order, for example, the heating by unit 44 may be provided between the ventilator 43 and the filter unit.

Also, in embodiments of the present disclosure, where the heat exchange between the first pane elements 10 and the thermal treatment compartment 11 is configured to be mainly/primarily provided by means of the plurality of nozzles 12 by supplying a larger amount of gas to the second surfaces 4 compared to the amount of gas supplied to the first surface 3, this variation in gas flow may be obtained in any suitable kind of way. For example, by means of one or more valve(s) arrangements 45, 55 (see FIG. 2), by different ventilators controlled individually (see FIG. 1), by providing more and/or larger nozzles to provide the flow towards the second surface 4 compared to the number and/or size of the nozzle(s) providing the gas towards the first surface 3 (not illustrated), and/or the like.

Preferably, the gas flow 40 supplied towards the at the second surface 4 of the pane elements 10 is at least 1.3 times, such as at least 1.5 times, e.g. at least two times, such as at least three times, e.g. at least five times larger than a second gas flow 50 provided simultaneously by e.g. the nozzles 13, at the first surface 3 comprising the soldering material 2.

In embodiments of the present disclosure, a temperature difference between the gas flow provided at the surface 4 and the surface 3 respectively is provided. This may e.g. be obtained by having different heating units as disclosed in FIG. 1 which are controlled differently. This provides that the thermal treatment compartment 11, e.g. in a convection heating step may mainly be provided at the second surface 4 by a substantially identical amount of gas supply at both surfaces in the compartment 11, but with a higher temperature than the temperature provided towards the first surface 3 comprising the soldering material. The temperature difference may be between 3° C. and 50° C. such as between 5° C. and 25° C.

Generally, it is to be understood that the control arrangement CA may comprise a computer processor and a data storage comprising a computer program (neither of these are illustrated in the drawings) which, when executed by the computer processor is configured for providing and controlling the forced convection heating and/or cooling in the furnace arrangement 4. The control arrangement may comprise a PLC (Programmable, Logical Controller) Or the like, and may receive input from temperature measurement devices in the piping system(s) 41, 51, the compartment(s) 11, 14, and/or the like, and may, based thereon, control valves, ventilator(s), heating and/or cooling units and/or the like to provide the desired gas convection treatment process to provide the thermal treatment of the soldering material.

Figure 3:
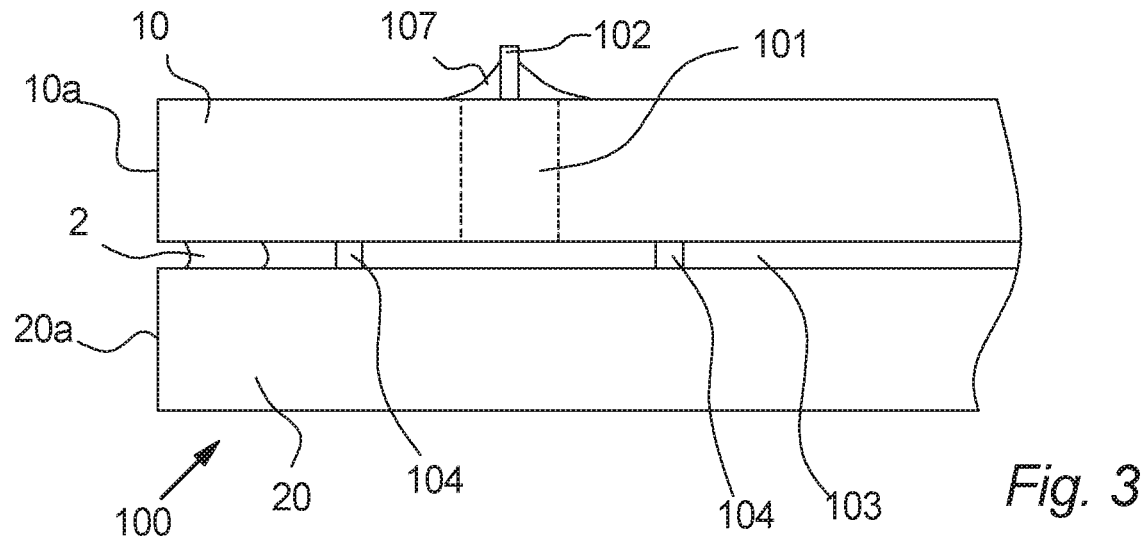
FIG. 3 illustrates schematically a VIG unit composition according to aspects of the present disclosure.

FIG. 3 shows a vacuum insulating glazing (VIG) unit 100 with two glass panes/pane elements 10, 20. The VIG production method is done by providing first and second substantially parallel pane elements 10, 20, a plurality of pillars 104 and a peripheral seal 2 near the edges 10*a*, 20*a* of the pane elements 10, 20. The void 103 between the panes 10, 20 is sealed by a periphery sealing 2 of the pane elements 10, 20, by a soldering material, preferably solder frit or solder glass. The pane elements 10, 20 are spaced by a plurality of pillars 104. The pillars 104 withstand the pressure when the void 103 of the VIG 100 is evacuated and the atmosphere acts on the VIG 100. The provided vacuum in the void is preferably at least 0.001 mbar after evacuation and sealing of the void 103, but the pressure may advantageously be even lower.

The pane element 10 has an evacuation hole 101, and an evacuation tube 102 provides a path for flow of gas from the internal void 103 during evacuation of the void 103. The evacuation tube 102 is attached to the pane element 10 by a sealing 107 for example soldering material such as a solder glass material. After the evacuation of the void is finished, e.g. by means of a suction cup connected to an evacuation pump and covering the hole 101, seal 107 and tube 102, the evacuation tube 102 is sealed, e.g. by melting the evacuation tube, or in the event that no evacuation tube is used for evacuation, by means of melting the sealing material 107. Generally, it is to be understood that the example of FIG. 3 represents an example of a VIG, and thus e.g. the relative dimensions between the pane thicknesses, pillar sizes, the void 103 height (i.e. distance between pane surfaces of the panes facing the void), the evacuation method and sealing of the evacuation hole 101 and the like may vary.

In preferred embodiments, the pane elements 10, 20 are made from tempered glass, as tempered glass has an improved strength compared to non-tempered glass panes, and thus, the distance between the pillars in the void may be increased.

Moreover, it is preferred that at least the edge frit 2 is made from a lead-free soldering material (e.g. vanadium oxide or other lead-free substitutes may be provided instead in order to obtain desired temperature characteristics of the soldering material 2), which is applied in paste form to the surface of a pane element. The soldering material 2 preferably comprises at least 50% glass frit, a binder material and a solvent when in the paste form to be applied at the surface of the pane element 10 and/or 20. Preferably, the soldering material 2 between the pane elements comprises between 60 wt % and 85 wt % glass frit, Between 1 wt % and 6 wt % Binder material (and possibly other additives), and between 14 wt % and 34 wt % solvent, when in the paste form to be applied at the first surface of the first pane element.

Figure 4:
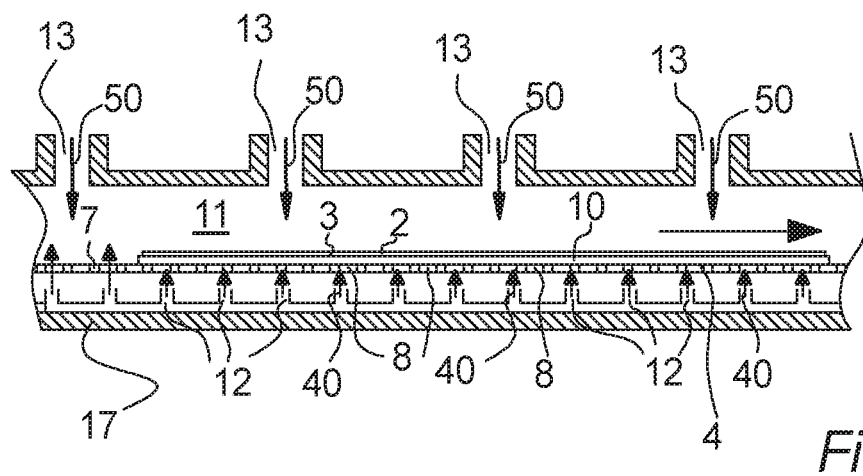
FIG. 4 illustrates schematically a gas convection treatment process according to still further aspects of the present disclosure.

FIG. 4 illustrates an embodiment of the present disclosure wherein the thermal treatment compartment 11 comprises a conveyer system including a conveying element 7 in the form of a conveyer belt or chain conveyer having a plurality of perforations/openings 8 through which the gas supply 40 can be provided towards the second pane surface 4 from a plurality of nozzles 12 beneath the conveyer belt or chain belt. A larger gas flow 40 is provided at the second surface 4 of the pane elements 2 compared to a second gas flow 50 provided simultaneously at the first surface 3 of the first pane elements 10 in the thermal treatment compartment 11, 14, as more air supply openings are arranged to provide the flow 40 towards the second surface 4 compared to the flow towards the first surface 3. Naturally, it may also or alternatively comprise an increase in air pressure of the gas flow 40 towards the lower surface 4 of the pane element 10 compared to the gas flow 50 towards the surface 3 on which the soldering material 2 supports.

Generally, the thermal treatment compartments 11, 14, preferably, substantially abut.

Figure 5:
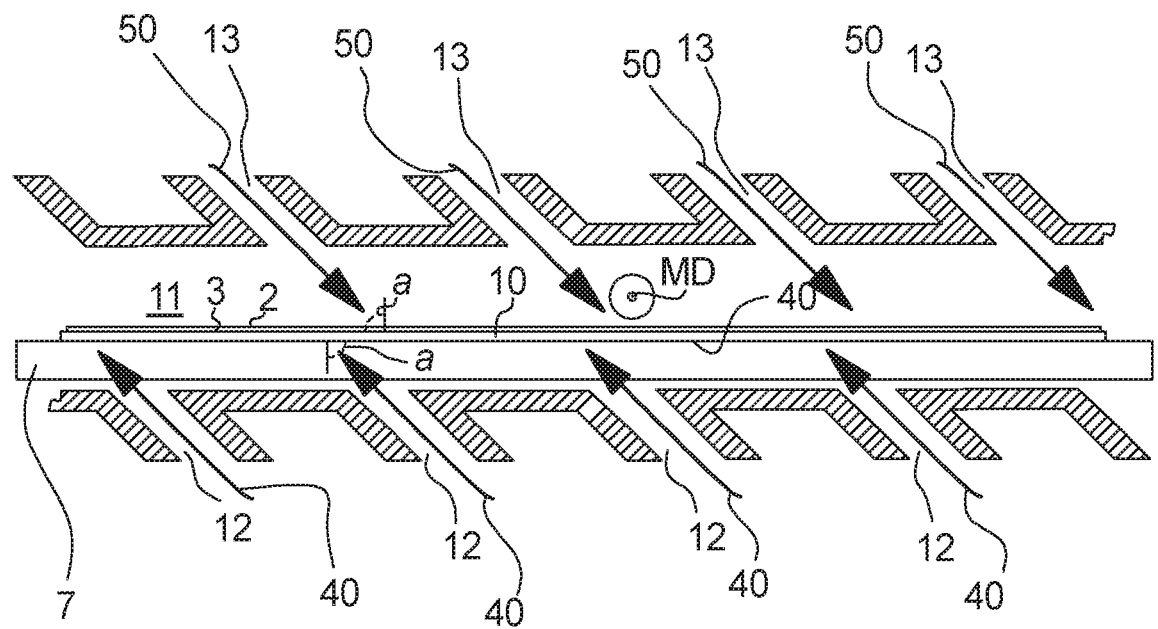
FIG. 5 illustrates an apparatus according to aspects of the present disclosure where gas supply is provided at an angle different from perpendicular to pane elements in a thermal treatment compartment.

FIG. 5 illustrates an embodiment of the present disclosure wherein the forced gas convection 40, 50 by the nozzles 12 and/or 13 is provided at an angle (a) between 3° and 70° to the first and/or second pane surface(s) (3, 4), preferably between 10° and 60° to the first 3 and/or second pane surface(s) 4.

In the present example, the gas provided by the nozzles 12, 13 at both surfaces 3, 4 of the pane elements 10 is provided with the angle a to the respective surface 3, 4 of the pane element 10. In other embodiments, the angular a gas supply by the nozzles 12 and/or 13 may be provided by the gas supply 50 by the nozzles 13 only at the first side/surface 3 comprising the soldering material 2. In further embodiments, the angular a gas supply by the nozzles 12, 13 may be provided only by the gas supply 40 at the second side 4.

The angle a of the gas supply is provided to so that possible contaminants such as dust or other particles in the gas 40 and/or 50 or existing in the compartment 11 are blown away from the surface 3 and/or 4, and towards side edges of the pane elements 10. The nozzles 12, 13 may thus be arranged to provide the gas flow 40, 50 in a direction at least having a component transverse to the movement direction MD of the pane element 10 in the thermal treatment compartment 11 as illustrated in FIG. 5*a*.

Figure 5A:
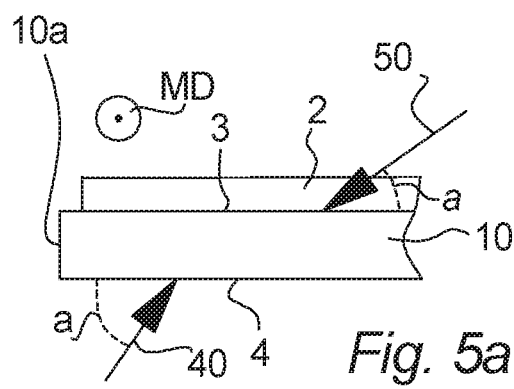
FIGS. 5a-5b illustrate an apparatus according to aspects of the present disclosure where gas supply is provided at an angle different from perpendicular to pane elements in a thermal treatment compartment.
Figure 5B:
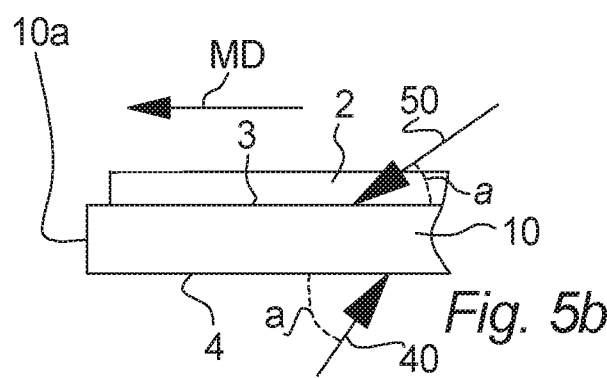

In other embodiments the nozzles 12, 13 are arranged to provide the gas flow 40, 50 in (and/or against) the movement direction MD of the pane element as illustrated in FIG. 5*b*.

Moreover, the angular/angled gas supply 40 and/or 50 may in embodiments be provided both with an angle a to blow the gas in a direction transverse to the movement direction MD of the pane element 10 in the thermal treatment compartment 11 as illustrated in FIG. 5*a*, and moreover in (and/or against) the movement direction MD of the pane element 10.

Figure 6:
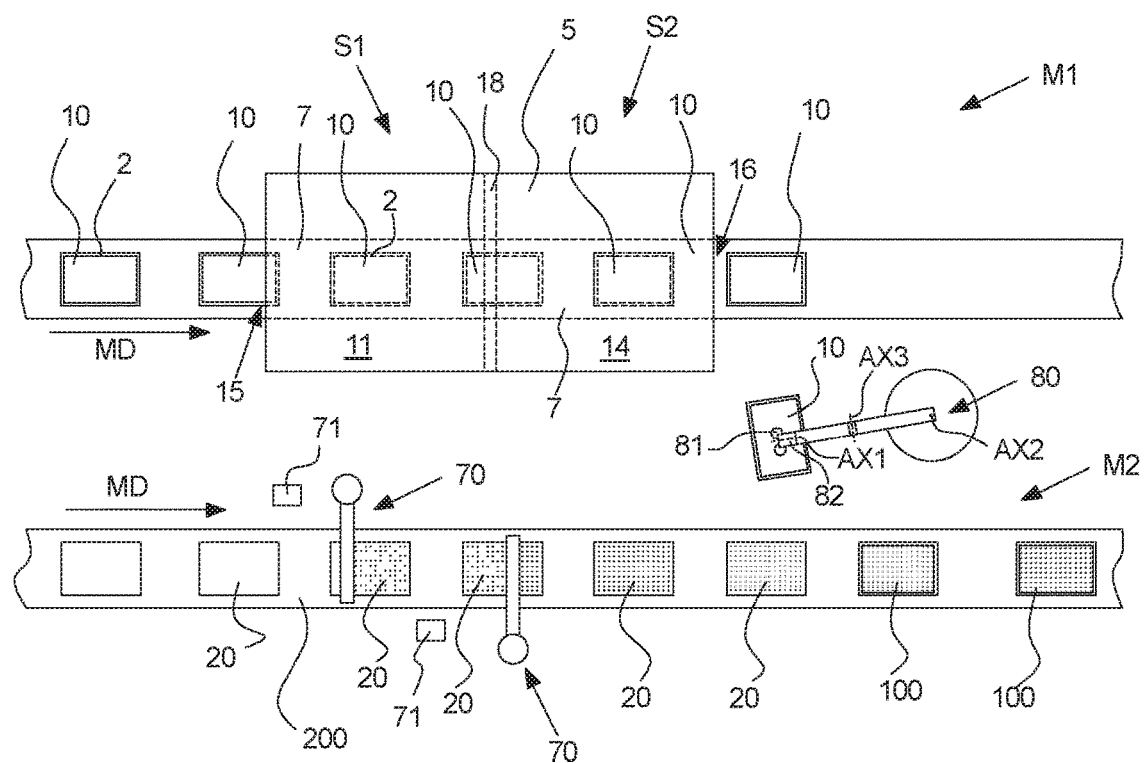
FIG. 6 illustrates aspects of the present disclosure relating to among others utilization of separate thermal treatment compartments and manufacturing processes for connecting panes for VIG units.

FIG. 6 illustrates an embodiment of the present disclosure wherein the gas convection treatment process comprises a first thermal treatment step S1 in a first thermal treatment compartment 11 and a second thermal treatment step S2 in a second thermal treatment compartment 14 of a furnace arrangement 5. The compartments 11, 14 are arranged next to each other so that the pane elements 10 enters the heating compartment/first compartment through the inlet 15, and is transported by a conveyer system comprising conveyer elements 7 (e.g. a conveyer system as illustrated and described in relation to one or more of FIGS. 1-5*c*), through the compartment 11 so that the first thermal treatment step S1 is provided and then passes a heat insulating arrangement 18 such as a mechanical partition wall arrangement and/or an air curtain/door and into the second compartment 14. The conveyer system conveys the pane elements 10 through the second compartment 14 so that the second thermal treatment step S2 is provided, and then exits the pane elements from the furnace arrangement 5 through an outlet 16.

The first thermal treatment step S1 is a heating step where the soldering material 2 at the first surface 3 of the pane elements 10 is dried out by evaporating solvent from the soldering material 2 by forced convection heating. This is preferably provided at a drying temperature between 140° C. and 240° C., such as between 160° C. and 220° C., preferably between 180° C. and 200° C., such as about 190° C. to evaporate solvent from the soldering material.

After the first thermal treatment step S1 in compartment 11, the pane elements 3 are moved into a second thermal treatment compartment 14 where a cooling step S2 is provided. The cooling step (S2) is provided by forced convection cooling in the second compartment 14 so as to cool the soldering material 2 and the first pane elements 10 subsequent to the heating step S1. The cooling gas supplied in the compartment 14 preferably has a temperature between 5° C. and 70° C., such as between 10° C. and 45° C., preferably around 15° C.-25° C. Preferably, the soldering material and/or the first pane elements has a temperature between 40° C. and 90° C., such as between 50° C. and 80° C., such as about 45° C. to 60° C. after cooling step 2, when leaving the cooling compartment 14 of the furnace arrangement 5.

FIG. 6 illustrates a further embodiment of the present disclosure wherein a part of the manufacturing of VIG elements 100 is provided by a substantially continuous manufacturing process for preparing and bringing together first pane elements 10 and second pane elements 20. The manufacturing process comprises manufacturing line M1 for preparing the first pane elements 10 as e.g. described in one or more of the above mentioned embodiments, and a second manufacturing process M2 for preparing the second pane elements (20).

The second manufacturing line M2 provides a preparation of the second pane elements for connecting to the first pane elements, this preparation of the second pane elements 20 at the second manufacturing line M2 may e.g. comprise a pillar placing process where one or more pillar placement arrangement 70 such as e.g. a robotic solution distributes and places a plurality of pillars (see FIG. 3) from a pillar storage 71 and onto an upwardly facing surface of the second pane elements (20), e.g. while the pane elements 20 are moved on a conveying system 200 separate to the conveying system 7 of the first manufacturing line M1.

In alternative embodiments, the pillar placing may include "printing" the pillars onto the surface of a pane element such as the first and/or second pane element.

The second manufacturing line M2 may also or alternatively comprise the preparation step of removing coating(s) such as e.g. low-e coating at the upwardly facing surface of the second pane elements 20 which is to face the void of the VIG. Such low-e coatings may e.g. be configured to reduce the emissivity of the VIG so that a higher proportion of infra-red radiation from the inside of a building, where the VIG is placed in an aperture of the building, is reflected by the VIG back into the building instead of being absorbed by the VIG and then re-radiated to the exterior of the building. These coatings however needs to be removed at the parts of the surface that should connect with the soldering material 2 near the edges of the pane element in order to provide a sufficient bonding with the soldering material.

The second manufacturing line M2 may also or alternatively provide a cleaning of the second pane elements 20 prior to connecting the first pane elements 10 with the second pane elements 20

A pane placement arrangement 80 such as a robotic arrangement comprising a robotic arm for placing the first pane elements 10 on the second pane elements 20 grabs the first pane elements 10 at the second surface 4, which preferably faces downwards when leaving the furnace arrangement 5. The pane placement arrangement 80 may e.g. comprise a controllable suction cup arrangement 81 for this purpose. The pane placement arrangement 80 then orientates the first pane 10 so that the surface 3 and the soldering material thereon faces downwards. This may e.g. be provided by rotating a part 82 of the arm around a first rotation axis AX1. The pane placement arrangement 80 then places the first pane elements 3 on top of the second pane elements 20 which may e.g. comprise the distributed pillars. This may moreover comprise rotating a part or the whole robotic arm around a second axis AX2, which may e.g. be substantially vertical and/or rotate a part of the robotic arm around a third axis ax3 to move the first pane elements 10 from the first manufacturing line M1 to the second manufacturing line M2 and to place the pane elements at a proper location on top of the second pane elements so that the soldering material 2 is placed near the edges of the second pane elements 20. The pane placement arrangement 80 may e.g. comprise a vision system or the like (not illustrated) to control this movement and placement.

It is generally to be understood that the pane placement arrangement 80 and/or the pillar placement arrangement 70 may comprise any suitable number and/or type of placement arrangement(s), e.g. including one or more robotic arms which may comprise a suitable number of movement axes.

After the panes 10 have been arranged on top of the pane elements 20, the resulting elements 100 are moved into e.g. a baking unit to burn out binder material and to melt particles such as glass frit of the dried out soldering material, and subsequently, an evacuation of the void between the glass panes (see FIG. 3) is provided.

FIG. 7 illustrates an embodiment of the present disclosure wherein the gas convection treatment process comprises a first thermal treatment step S1 in a first thermal treatment compartment 11 and a second thermal treatment step S2 in a second thermal treatment compartment 14 of a furnace arrangement 5. The compartments 11, 14 are arranged next to each other so that the pane elements 10 enters the heating compartment/first compartment 11 through the inlet 15, and is transported by a conveyer system comprising conveyer elements 7 (e.g. a conveyer system as illustrated and described in relation to one or more of FIGS. 1-5c), through the compartment 11 so that the first thermal treatment step S1 is provided and then passes the heat insulating arrangement 18 and into the second compartment 14 where the conveyer system in the second thermal treatment compartment transports the pane elements 10 towards the outlet 16.

The heat insulating in this embodiment comprising a mechanical partition wall arrangement 18a (e.g. comprising a heat insulating material 18a_1) and an air curtain/door 18b (provided by one or a plurality of air curtain nozzles 18b_1) for providing a further thermal insulation between the compartments 11, 14.

In other embodiments, the heat insulating arrangement 18 may comprise an air curtain/door 18b (provided by one or a plurality of air curtain nozzles 18b_1) alone (as illustrated in FIG. 7b, or alternatively a partition wall with an opening having either a mechanical door (not illustrated) that may open and close as the panes 10 enters through the opening, or alternatively just an opening in the partition wall between the compartments 11, 14 as illustrated in FIG. 7a.

The conveyer system conveys the pane elements 10 through the second compartment 14 so that the second thermal treatment step S2 is provided, and then exits the pane elements from the furnace arrangement 5 through an outlet 16.

The conveyer systems comprising one or more conveying elements 7 of the respective compartments 11, 14 may be independently controlled or alternatively be one conveyer system extending through both compartments 11, 14.

The furnace arrangement 5 comprises a convection heating system CHS and a convection cooling System CCS. The convection heating system may operate as e.g. disclosed in relation to e.g. FIGS. 1, 2 and/or 6. The convection cooling system CCS, as the convection heating system CHS provides a temperature controlled gas. The temperature controlled gas provided to the compartment 14 from the convection cooling system CCS by nozzles 12, 13 has a lower temperature than the temperature in the compartment 11, see e.g. example of preferred temperature ranges of the convection cooling gas supplied to the compartment 14 in step S2, and the convection heating gas supplied to compartment 11 in step S1. It is this clear from FIG. 7 that the convection heating system CHS and the convection cooling system CCS may each be individually controlled with respect to temperature and in embodiments of the present disclosure also the amount of gas supplied to the respective compartments 11, 14.

Accordingly, the convection heating system CHS system and convection cooling system CCS may comprise separate heating units, and/or separate filtering units or a common/shared filtering unit 6 so that gas supply to both the CHS and CCS receives gas through the same filtering unit, and/or separate ventilators and/or common ventilators so that gas supply to both the CHS and CCS receives gas by means of the same ventilator. This is not illustrated in FIG. 7.

It is generally understood that the convection cooling step S2 and/or the convection heating step S1 provided in the gas convection treatment process in the furnace arrangement may comprise that the heat exchange between the first pane elements 10 and the thermal treatment compartment 11, 14 is mainly provided by means of a forced convection of a temperature controlled gas, which is supplied to the second surface 4 of each of the first pane elements 10 as e.g. described above.

The convection cooling system CCS and/or the convection heating system CHS may each comprise a control arrangement CA as e.g. described in relation to FIGS. 1 and/or 2. Alternatively OR additionally, the convection cooling system CCS and/or the convection heating system CHS may be controlled by a common Control arrangement which is configured to control the supply of gas/air by means of e.g. input from temperature measurement devices and/or other input, e.g. as described in relation to FIGS. 1 and/or 2.

Figure 8:
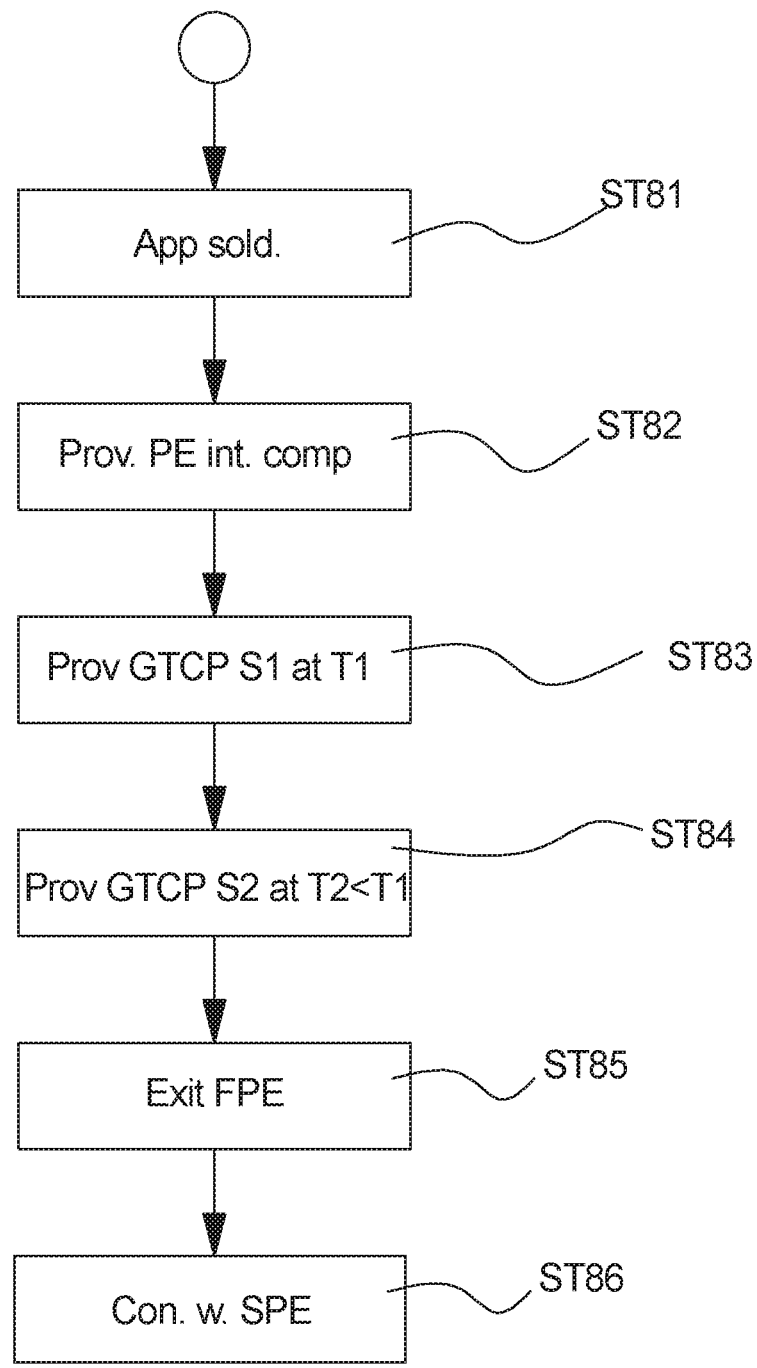
FIG. 8 illustrates a flowchart disclosing advantageous processing methods of first pane elements according to aspects of the present disclosure.

FIG. 8 illustrates embodiments of an advantageous processing of first pane elements 10.

In Step ST81 (App sold), the soldering material such as a gas frit soldering material comprising glass frit (such as at least 50% glass frit by weight of glass frit, based on the total weight of the soldering material;), binder material and solvent is applied in a paste form onto the surface of first pane element(s) for VIG units. The first pane elements are then in Step ST82 (Prov. PE int. comp.) moved into a thermal treatment compartment which is pre-heated. In step ST83 (Prov. GTCP S1 at T1), a gas convection treatment process is provided comprising a heating step S1 where the pane elements and the soldering material applied in step S81 is heated at a predefined temperature T1, e.g. between 140° C. and 240° C., such as between 160° C. and 220° C., preferably between 180° C. and 200° C., such as about 190° C. to evaporate solvent from the soldering material.

The first pane elements may generally, preferably be subjected to the heating step S1 for about 3-15 min, preferably 4-7 minutes before subjected to the cooling step S2. This timer functionality is not illustrated in FIG. 8, but may be provided by a timer functionality of a control arrangement CA.

This may be done while having the first pane elements arranged non-moving in the compartment for a predefined time controlled by a control system, or alternatively, the pane elements may be heated while moved through the compartment by a conveying system without stopping the movement in the compartment during the thermal treatment.

Then, in step ST84 (Prov. GTCP S2 at T2), a cooling step is provided at a temperature T2 that is substantially lower than T1, so as to cool the first pane elements to the desired temperature. Preferably the cooling gas supplied has a temperature between 5° C. and 70° C., such as between 10° C. and 45° C., preferably around 15° C.-25° C. This is preferably provided in another compartment than where the heating step is provided, see e.g. FIGS. 6 and 7, alternatively, the heating step S1 and the cooling step S2 may be provided in the same compartment by changing the temperature of the supplied gas from T1 to T2, e.g. in a batch processing solution.

The temperature during cooling is preferably at least 5 times, such as at least 7 times, e.g. at least 10 times such as at least 20 times lower than the temperature of the gas provided in the heating step.

The first pane elements may generally, preferably be subjected to the cooling step S2 for about 1-10 minutes, preferably 2-6 minutes before leaving the furnace arrangement 5 to be connected with the second pane elements as e.g. illustrated and described in relation to FIG. 6.

In step ST84 (Exit FPE), the first pane element is exited from the cooling step by a conveyer system, see e.g. previous description.

Then, in step ST86—(Con. W. SPE), the first pane element comprising the dried out soldering material is connected to a second pane element by means of the dried out soldering material. Preferably, the soldering material has a temperature between 40° C. and 90° C., such as between 50° C. and 80° C., e.g. as about 45° C. to 60° C. after cooling step 2, when leaving the cooling step and connecting the pane elements, as the soldering material may at this temperature be flexible but shape stable, so that it may provide an improved edge sealing functionality.

It is generally to be understood that in preferred embodiments of the present disclosure, the glass panes 10, 20 as described in relation to one or more of FIGS. 1-8 may be tempered glass panes.

Figure 9:
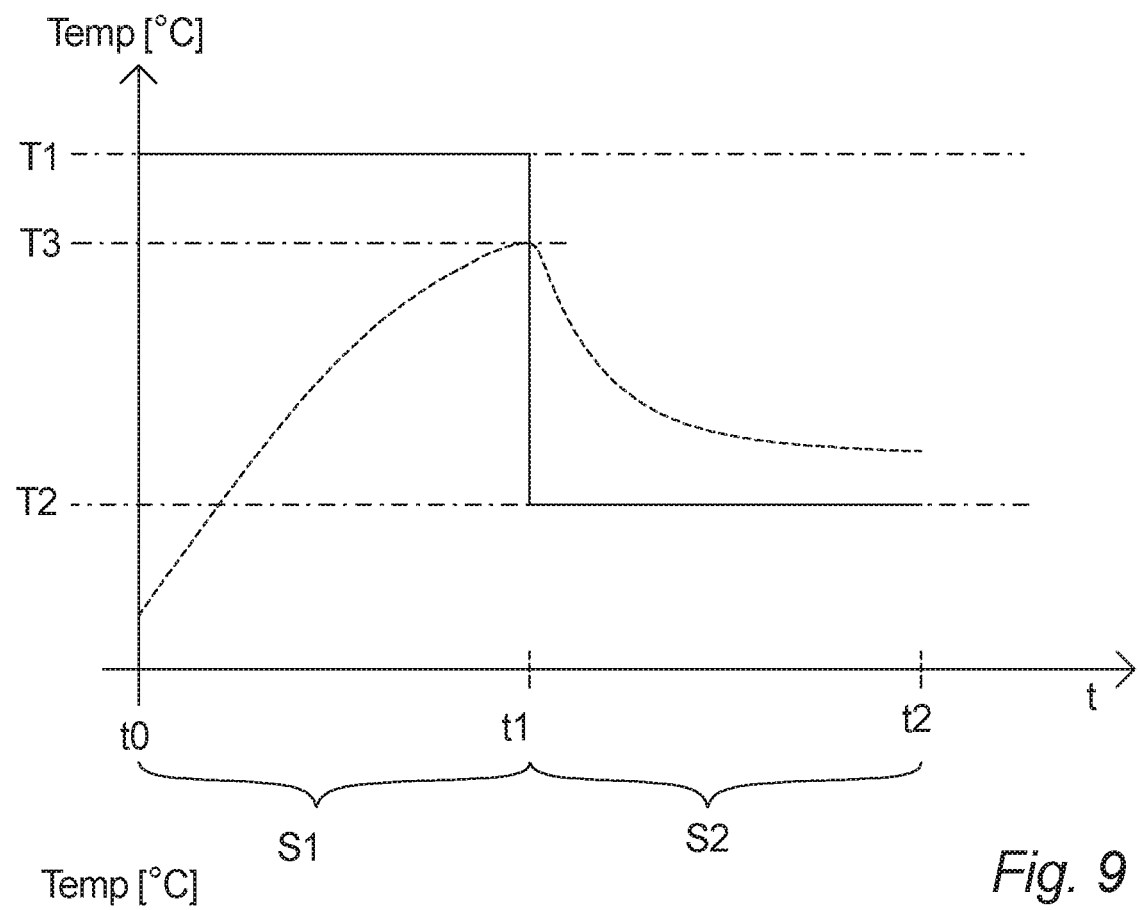
FIGS. 9-10 illustrate examples of the temperature of a glass pane when subjected to a heating step and a subsequent cooling step, according to various aspects of the present disclosure.

FIG. 9 illustrates schematically an example of the temperature of a glass pane (dashed line) when subjected to a heating step S1 and a subsequent cooling step S2 over time t. The heating step S1 is provided between t0 and t1, and the cooling step is provided between t1 and t2. The y-axis indicates the temperature in ° C.

The temperature provided for the respective heating step S1 and cooling step S2 is illustrated by the solid line. In the heating step S1, the drying temperature T1 may be between 140° C. and 240° C., such as between 160° C. and 220° C., e.g. around 200° C.

As can be seen, the glass temperature gradually increases during the heating step between t0 and t1 during dry-out of the soldering material. At time t2, the glass pane enter the cooling step S2, where the cooling temperature T2 is substantially lower than T1, so as to cool the first pane elements to the desired temperature. Preferably the cooling gas supplied has a temperature T2 between 5° C. and 70° C., such as between 10° C. and 45° C., preferably around 15° C.-30° C. such as around 25° C.

The first pane elements may generally, preferably be subjected to the cooling step S2 at a cooling time period t1-t2 for about 1-10 minutes, preferably 2-6 minutes before leaving the furnace arrangement 5 to be connected with the second pane elements as e.g. illustrated and described in relation to FIG. 6.

When the glass pane and the soldering material thereon has reached a target temperature during the cooling step, the pane leaves the cooling compartment to be connected with the second pane elements, which may e.g. be provided as illustrated and/or described above, for example in relation to FIG. 6.

Generally, it is understood that in various embodiments of the present disclosure, a treatment time (t0-t1) for the heating step S1 may be between 2 and 10 minutes such as between 4 minutes and 7 minutes, e.g. about 5 minutes, and/or the treatment time (t1-t2) for the cooling step S2 may be between 2 and 10 minutes such as between 4 minutes and 7 minutes, e.g. about 5 minutes.

Generally, it is understood that in various embodiments of the present disclosure. The pane and/or soldering material may e.g. reach a temperature (T3 in FIG. 9) between 115° C. and 175° C., such as between 135° C. and 165° C., e.g. around 150° C. during the heating step, before the cooling step is initiated.

Figure 10:
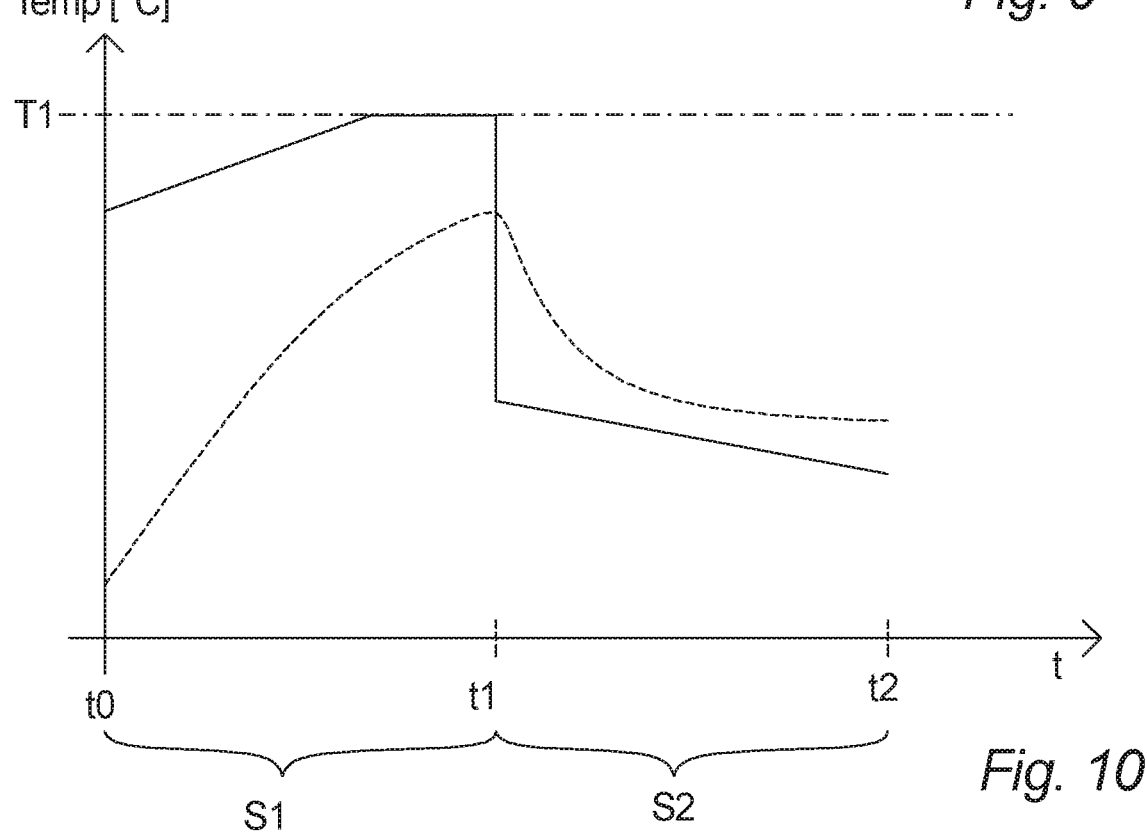

In FIG. 9, it is illustrated that the temperature in the first and second step respectively may be kept substantially constant in embodiments of the present disclosure. This may e.g. be provided by supplying a gas flow of a substantially constant temperature for the respective step S1 and/or S2. However, in other embodiments of the present disclosure, e.g. during a "batch process dry out solution" the temperature may be varied by controlling and adjusting the temperature of the supplied gas during the heating step and/or cooling step, e.g. as illustrated in FIG. 10, according to a predefined temperature profile (solid line).

Generally, it is to be understood that the conveyer/conveying system described in relation to the various aspects above in the present disclosure may be of any suitable type for transporting the first pane elements during dry out of the soldering material. For example, the conveying system may comprise one or more conveyer elements, e.g. comprising a plurality of rollers (as illustrated in e.g. FIGS. 1, 2 and 7) for supporting and transporting the first panes, it may comprise an endless chain drive (not illustrated) or conveyer belt (as e.g. illustrated in FIG. 4) and/or the like. In further aspects, the conveyer/conveying system may be of a type where the pane elements hangs from one or more conveyer elements, e.g. substantially vertically (not illustrated).

In general, it is to be understood that the present disclosure is not limited to the particular embodiments described above but may be adapted in a multitude of varieties within the scope of the present disclosure as specified in e.g. the claims.

The invention claimed is:

1. A method for manufacturing a plurality of vacuum insulating glass (VIG) units,
wherein the method comprises the steps of:
providing a plurality of first glass panes,
applying a soldering material in paste form to a first surface along side edges of the first glass panes, wherein the soldering material is arranged for subsequent connection with a second glass pane to provide a seal between an outside of the VIG unit and an inside void of the VIG unit,
moving the first glass panes comprising the soldering material into a first thermal treatment compartment of a furnace arrangement, wherein the first thermal treatment compartment is pre-heated,
drying the soldering material on the first glass panes in a heating step by evaporating solvent from the soldering material in the first thermal treatment compartment, wherein the heating is forced convection heating,
moving the first glass panes from the first thermal treatment compartment to a cooling compartment of the furnace arrangement,
cooling first glass panes and the soldering material thereon in a cooling step in the cooling compartment, wherein the cooling is by forced convection cooling,
moving the first glass panes from the cooling compartment, and
subsequently connecting the first glass panes to second glass panes using the dried soldering material.

2. The method according to claim 1, wherein the forced convection heating and/or the forced convection cooling is provided to a second surface opposite to the first surface of each of the first glass panes using a plurality of nozzles in the first thermal treatment compartment and/or the cooling compartment directed towards the second surfaces.

3. The method according to claim 1, wherein the forced convection heating is at a temperature between 140° C. and 240° C.

4. The method according to claim 1, wherein a total treatment time for the heating step and the cooling step is between 4 and 15 minutes.

5. The method according to claim 1, wherein the heating step is provided in the first thermal treatment compartment, and wherein the cooling step is provided in the cooling compartment that is arranged after the first thermal treatment compartment.

6. The method according to claim 5, wherein the first thermal treatment compartment and the cooling compartment are separated by a heat insulating arrangement.

7. The method according to claim 1, wherein the soldering material and/or the first glass pane has a temperature of between 40° C. and 100° C. after cooling in the cooling step.

8. The method according to claim 1, wherein the heating step and/or cooling step is provided by a plurality of first nozzles directed towards a second surface opposite to the first surface of each of the first glass panes, and one or more second nozzles directed towards the first surfaces comprising the soldering material.

9. The method according to claim 1, wherein the heating step and/or the cooling step is provided by forced convection of a temperature controlled gas, by supplying a larger gas flow at a second surface opposite to the first surface of each of the first glass panes compared to a second gas flow provided simultaneously to the first surface of the first glass panes in the first thermal treatment compartment.

10. The method according to claim 1, further comprising conveying the first glass panes through the first thermal treatment compartment and the cooling compartment using a conveyer system,
wherein the first glass panes are transported through an inlet opening of the furnace arrangement to an outlet opening of the furnace arrangement.

11. The method according to claim 10, wherein a second surface of each of the first glass panes is supported on one or more conveyer elements of the conveyer system, and
wherein the heating step and/or the cooling step is provided by forced convection of a temperature controlled gas supplied to the second surface of each of the first glass panes between or through the one or more conveyer elements.

12. The method according to claim 1, further comprising supplying a gas during the heating step and/or the cooling step, wherein the gas is filtered air.

13. The method according to claim 1, wherein the first and second glass panes are tempered glass.

14. The method according to claim 1, wherein the method is provided in a substantially continuous manufacturing process comprising a first manufacturing line for preparing the first glass panes, and a second manufacturing line for preparing the second glass panes, wherein the first manufacturing line provides the forced convection heating and cooling, wherein the second manufacturing line is configured to prepare the second glass panes for connecting to the first glass panes after the heating step and the cooling step, and wherein the first and second manufacturing lines are substantially parallel processes.

15. The method according to claim 14, wherein the second manufacturing line comprises a pillar placing process where a pillar placement arrangement system distributes and places a plurality of pillars on an upper surface of the second glass panes.

16. The method according to claim 1, wherein the soldering material on the first glass panes comprises
at least 50% by weight of glass frit, based on the total weight of the soldering material;
a binder material; and
a solvent,
wherein the soldering material is a paste.

17. The method according to claim 1, wherein said moving of the first glass panes from the first thermal treatment compartment to a cooling compartment of the furnace arrangement is provided by a conveyer system.

18. A method for manufacturing a plurality of vacuum insulating glass (VIG) units, wherein the method comprises the steps of:
providing a plurality of first glass panes;
applying a soldering material in paste form on a first surface of each first glass pane along side edges, wherein the soldering material is configured for subsequent connection with a second glass pane to provide a seal between the outside of the VIG unit and an inside void of the VIG unit where vacuum is to be provided,
moving the first glass panes comprising the soldering material into a thermal treatment compartment;
providing a thermal treatment to the soldering material to evaporate a solvent from the soldering material;
moving the first glass panes from the thermal treatment compartment; and
subsequently connecting the first glass panes to the second glass panes using the dried soldering material,
wherein a gas convection treatment process is provided during the thermal treatment step, wherein the gas convection treatment process comprises heat exchange between the first glass panes and the thermal treatment compartment by forced convection of a temperature controlled gas that is supplied to the first surface and/or a second surface of the first glass panes opposite to the first surface using a plurality of nozzles in the thermal treatment compartment directed towards the first and/or the second surfaces, and
wherein the temperature controlled gas supplied during the gas convection treatment process is purified air.

19. The method according to claim 18, further comprising filtering the temperature controlled gas with a filtering unit before it is directed to the first glass panes.

20. The method according to claim 18, wherein the forced convection of the temperature controlled gas by the plurality of nozzles is provided at an angle between 3° and 80° to the first and/or second pane surface(s).

21. The method according to claim 18, wherein the gas convection treatment process comprises a first thermal treatment step and a second thermal treatment step,
wherein the first thermal treatment step comprises a heating step where the soldering material at the first surface is dried by evaporating the solvent from the soldering material by forced convection heating using a convection heating system,
wherein the second thermal treatment step comprises a cooling step where forced convection cooling is provided by a convection cooling system to cool the soldering material and the first glass panes subsequent to the heating step.

22. The method according to claim 18, wherein the method is provided in a substantially continuous manufacturing process comprising
a first manufacturing line for preparing the first glass panes, and
a second manufacturing line for preparing the second glass panes,
wherein the first manufacturing line provides the gas convection treatment process,
wherein the second manufacturing line provides a pillar placing process where a pillar placement arrangement system distributes and places a plurality of pillars on an upper surface of the second glass panes, and
wherein the first and second manufacturing lines are substantially parallel processes.

* * * * *